US012732279B2

(12) United States Patent
Takata et al.

(10) Patent No.: US 12,732,279 B2
(45) Date of Patent: Sep. 8, 2026

(54) OPTICAL TRANSMISSION DEVICE, COMMUNICATION DEVICE, CONTROL METHOD AND RECORDING MEDIUM

(71) Applicant: NEC Corporation, Tokyo (JP)

(72) Inventors: Koya Takata, Tokyo (JP); Hisashi Mizumoto, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 352 days.

(21) Appl. No.: 18/689,577

(22) PCT Filed: Sep. 21, 2021

(86) PCT No.: PCT/JP2021/034501
§ 371 (c)(1),
(2) Date: Mar. 6, 2024

(87) PCT Pub. No.: WO2023/047444
PCT Pub. Date: Mar. 30, 2023

(65) Prior Publication Data

US 2024/0380493 A1 Nov. 14, 2024

(51) Int. Cl.

| | |
|---|---|
| ***H04B 10/114*** | (2013.01) |
| ***G02F 1/01*** | (2006.01) |
| ***G02F 1/29*** | (2006.01) |
| ***H04B 10/50*** | (2013.01) |
| ***H04B 10/516*** | (2013.01) |
| ***H04N 9/31*** | (2006.01) |

(52) U.S. Cl.
CPC ......... *H04B 10/516* (2013.01); *G02F 1/0121* (2013.01); *G02F 1/29* (2013.01);
(Continued)

(58) Field of Classification Search
CPC .. H04B 10/114; H04B 10/503; H04B 10/516; G02F 1/0121; G02F 1/29; H04N 9/3141
(Continued)

(56) References Cited

U.S. PATENT DOCUMENTS

| | | | | |
|---|---|---|---|---|
| 10,673,525 B2 * | 6/2020 | Boruah | .............. | H04B 10/1121 |
| 12,284,466 B2 * | 4/2025 | Takata | ................. | H04N 9/3161 |

(Continued)

FOREIGN PATENT DOCUMENTS

| | | |
|---|---|---|
| JP | 2011-061267 A | 3/2011 |
| WO | 2017/169913 A1 | 10/2017 |
| WO | 2019/026167 A1 | 2/2019 |

OTHER PUBLICATIONS

International Search Report for PCT Application No. PCT/JP2021/034501, mailed on Dec. 14, 2021.

(Continued)

*Primary Examiner* — Li Liu
(74) *Attorney, Agent, or Firm* — Sughrue Mion, PLLC

(57) ABSTRACT

A optical transmission device comprising a light source, a spatial light modulator which has a modulation part onto which light emitted from the light source is radiated, and which modulates the phase of the radiated light by means of the modulation part, and a control unit which allocates modulation regions associated with respective communication targets to the modulation part of the spatial light modulator, configures, in each modulation region, a phase image for forming an image used in communication with the communication target in the position of the communication target, and controls the light source such that light is radiated onto the modulation part while the phase image is configured therein.

15 Claims, 26 Drawing Sheets

(52) U.S. Cl.
CPC ......... *H04B 10/503* (2013.01); *H04N 9/3141* (2013.01); *H04B 10/114* (2013.01)

(58) Field of Classification Search
USPC ................................ 398/118, 183, 192, 201
See application file for complete search history.

(56) References Cited

U.S. PATENT DOCUMENTS

| | | | | |
|---|---|---|---|---|
| 2004/0258415 | A1* | 12/2004 | Boone ................ | H04B 10/1125 398/125 |
| 2008/0056723 | A1* | 3/2008 | Giles .................... | H04B 10/118 398/118 |
| 2016/0131901 | A1* | 5/2016 | Huang ................... | G02B 26/06 250/201.9 |
| 2020/0159047 | A1* | 5/2020 | Kyosuna ............... | G02F 1/0121 |
| 2020/0295827 | A1* | 9/2020 | Watanabe ............ | H04B 10/112 |
| 2020/0366369 | A1* | 11/2020 | Kyosuna .............. | H04B 10/112 |
| 2023/0223733 | A1* | 7/2023 | Carrascoso Hernández ................ | H04B 7/18513 359/298 |

OTHER PUBLICATIONS

English translation of Written opinion for PCT Application No. PCT/JP2021/034501, mailed on Dec. 14, 2021.

* cited by examiner 1301
1302
1351
13
130

1301A1
1302A1
1303A1
1352A1
13
130
1352A2
1301A2
1302A2
1303A2

(E) COMMUNICATION TARGET = 3
230
E1
E2
E3
V1
(F) COMMUNICATION TARGET = 4 (+1)
230
E1
E2
E3
F
V2
(G) COMMUNICATION TARGET = 5 (+1)
230
E1
E2
E3
F
G
V3
(H) COMMUNICATION TARGET = 4 (−1)
230
E1
E2
E3
F
V2

OPTICAL TRANSMISSION DEVICE, COMMUNICATION DEVICE, CONTROL METHOD AND RECORDING MEDIUM

This application is a National Stage Entry of PCT/JP2021/034501 filed on Sep. 21, 2021, the contents of all of which are incorporated herein by reference, in their entirety.

TECHNICAL FIELD

The present disclosure relates to an optical transmission device and the like that transmit a spatial light signal.

BACKGROUND ART

In optical space communication, light signals (hereinafter, also referred to as spatial light signals) propagating in a space are transmitted and received without using a medium such as an optical fiber. For example, by using a phase modulation-type spatial light modulator, a spatial light signal can be transmitted in an arbitrary direction.

PTL 1 discloses a communication device including a phase modulation-type spatial light modulator. The device of PTL 1 includes a phase modulation-type spatial light modulator and a control unit for controlling an operation of the spatial light modulator. The control unit operates the spatial light modulator in a first operation pattern and a second operation pattern in one frame period. The first operation pattern includes a first optical transmission possible section in which first signal light can be output and a first pause section in which first signal light cannot be output in a predetermined period within the one frame period. The second operation pattern includes a second optical transmission possible section in which second signal light can be output and a second pause section in which second signal light cannot be output in a predetermined period. Each of the first optical transmission possible section and the second optical transmission possible section is longer than half of the predetermined period. The first optical transmission possible section includes the second pause section. The second optical transmission possible section includes the first pause section.

CITATION LIST

Patent Literature

PTL 1: WO 2019/026167 A

SUMMARY OF INVENTION

Technical Problem

In the method of PTL 1, the phase modulation-type spatial light modulation element is operated in two operation patterns, thereby reducing a period in which the phase modulation-type spatial light modulation element cannot transmit light. According to the method of PTL 1, continuous communication can be performed for a single communication target. However, in the method of PTL 1, in a case where a plurality of communication targets is located at different positions/directions with respect to the communication device, it is not possible to radiate the communication targets with uniform beams. In order to establish stable communication with a plurality of communication targets, it is required to radiate the communication targets with uniform beams. That is, in the method of PTL 1, stable communication cannot be established with a plurality of communication targets.

An object of the present disclosure is to provide an optical transmission device and the like capable of transmitting a stable spatial light signal to a plurality of communication targets.

Solution to Problem

A optical transmission device according to one aspect of the present disclosure includes a light source, a spatial light modulator having a modulation part to which light emitted from the light source is radiated, the spatial light modulator modulating a phase of the emitted light using the modulation part, and a control unit that allocates a modulation region associated with each of a plurality of communication targets to the modulation part of the spatial light modulator, sets, in the modulation region, a phase image for forming an image used for communication with the communication target at a position of the communication target, and controls the light source in such a way that the light is radiated to the modulation part in which the phase image is set.

A control method of one aspect of the present disclosure is a method for controlling an optical transmission device including a spatial light modulator that modulates a phase of light emitted from a light source using a modulation part, the method causing a computer to execute: allocating a modulation region associated with each of a plurality of communication targets to the modulation part of the spatial light modulator, setting, in the modulation region, a phase image for forming an image used for communication with the communication target at a position of the communication target, and controlling the light source in such a way that the light is radiated to the modulation part in which the phase image is set.

A program according to one aspect of the present disclosure is a program for controlling an optical transmission device including a spatial light modulator that modulates a phase of light emitted from a light source using a modulation part, the program causing a computer to execute: a process of allocating a modulation region associated with each of a plurality of communication targets to the modulation part of the spatial light modulator, a process of setting, in the modulation region, a phase image for forming an image used for communication with the communication target at a position of the communication target, and a process of controlling the light source in such a way that the light is radiated to the modulation part in which the phase image is set.

Advantageous Effects of Invention

According to the present disclosure, it is possible to provide an optical transmission device and the like capable of transmitting a stable spatial light signal to a plurality of communication targets.

EXAMPLE EMBODIMENT

Figure 1:
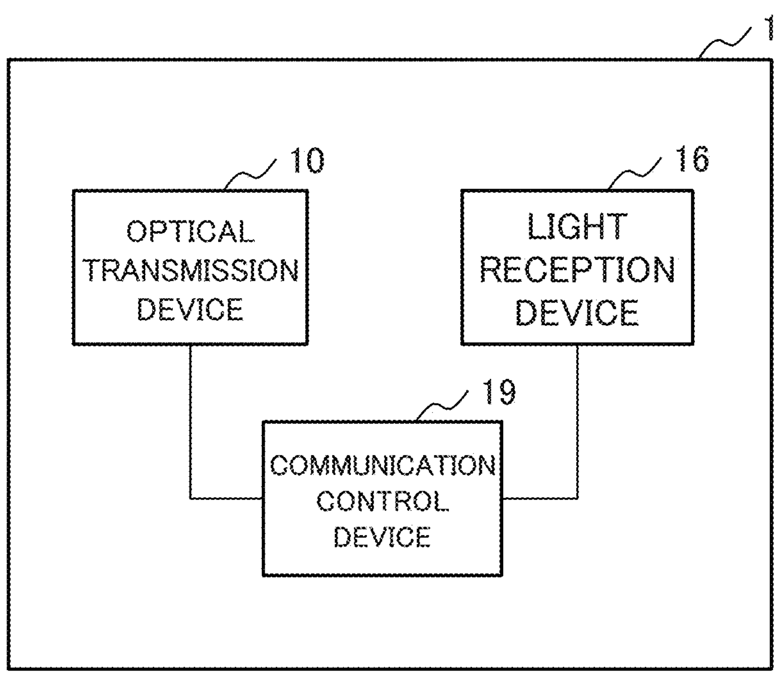
FIG. 1 is a block diagram illustrating an example of a configuration of a communication device according to a first example embodiment.

Hereinafter, example embodiments of the present invention will be described with reference to the drawings. However, the example embodiments described below have technically preferable limitations for carrying out the present invention, but the scope of the invention is not limited to the following. In all the drawings used in the following description of the example embodiment, the same reference numerals are given to the same parts unless there is a particular reason. In the following example embodiments, repeated description of similar configurations and operations may be omitted.

In all the drawings used for description of the following example embodiments, the directions of the arrows in the drawings are merely examples, and do not limit the directions of light and signals. In addition, a line indicating a trajectory of light in the drawings is conceptual, and does not accurately indicate an actual traveling direction or state of light. For example, in the drawings, a change in a traveling direction or a state of light due to refraction, reflection, diffraction, diffusion, or the like at an interface between air and a substance may be omitted, or a light flux may be expressed by one line.

First Example Embodiment

First, a communication device according to a first example embodiment will be described with reference to the drawings. The communication device according to the present example embodiment performs optical space communication for transmitting and receiving optical signals (hereinafter, also referred to as a spatial light signal) propagating in a space without using a medium such as an optical fiber. In the present example embodiment, an example in which optical space communication is simultaneously performed with a plurality of communication targets will be described.

(Configuration)

FIG. 1 is a block diagram illustrating an example of a configuration of a communication device 1 according to the present example embodiment. The communication device 1 of the present example embodiment includes an optical transmission device 10, a light reception device 16, and a communication control device 19. Hereinafter, the optical transmission device 10, the light reception device 16, and the communication control device 19 will be individually described.

[Light Transmission Device]

Figure 2:
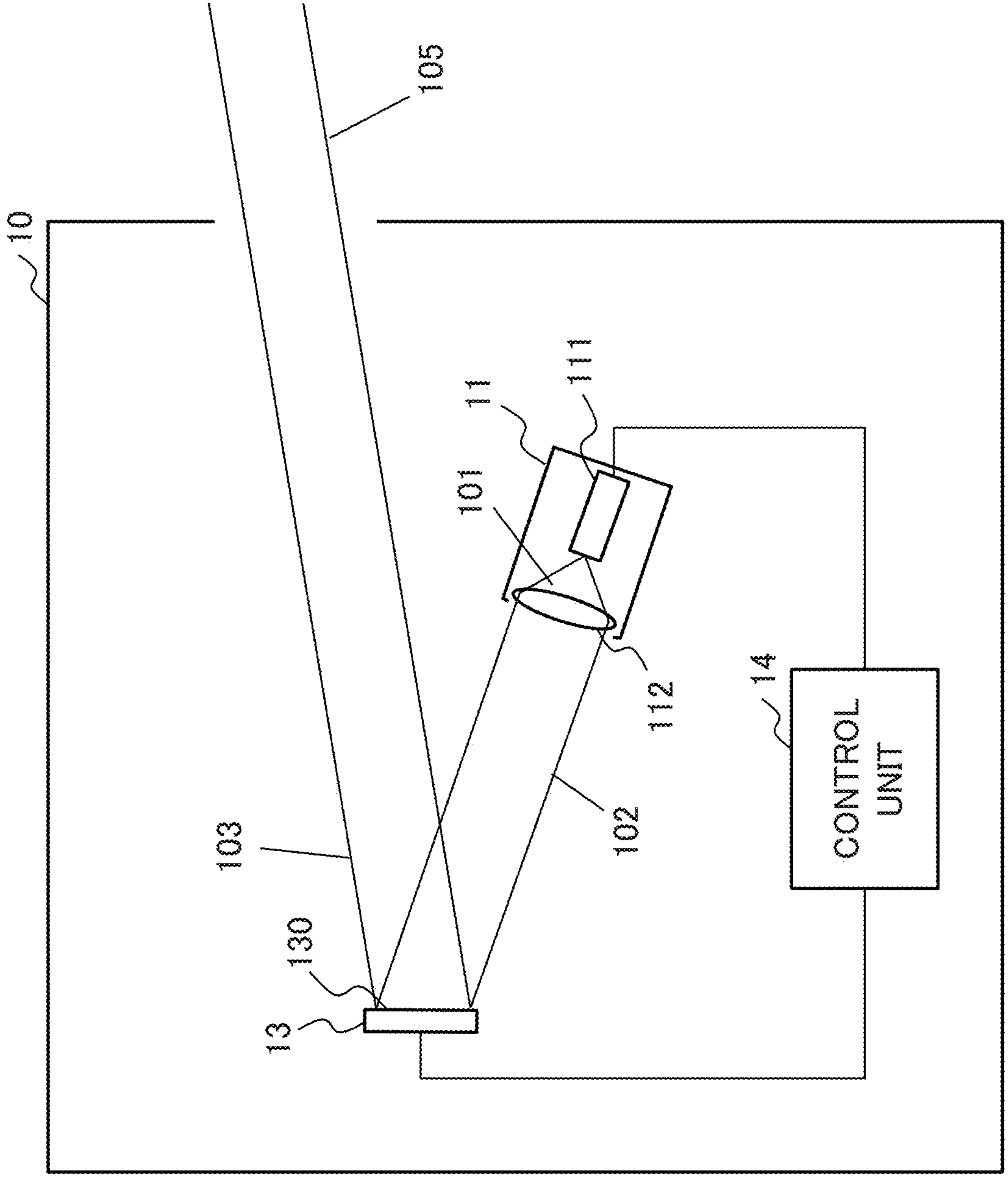
FIG. 2 is a conceptual diagram illustrating an example of a configuration of an optical transmission device included in the communication device according to the first example embodiment.

First, a configuration of the optical transmission device 10 will be described with reference to the drawings. FIG. 2 is a conceptual diagram illustrating an example of a configuration of the optical transmission device 10. The optical transmission device 10 includes a light source 11, a spatial light modulator 13, and a control unit 14. The spatial light modulator 13 includes a modulation part 130. FIG. 2 is a side view of the internal configuration of the optical transmission device 10 as viewed from the lateral direction. FIG. 2 is conceptual, and does not accurately represent a positional relationship between components, a traveling direction of light, and the like. The position of the control unit 14 is not particularly limited. The control unit 14 may be included in the communication control device 19.

The light source 11 includes an emitter 111 and a lens 112. The emitter 111 emits a laser beam 101 in a predetermined wavelength band toward the lens 112 under the control of the control unit 14. The lens 112 is disposed on an optical path of the laser beam 101 emitted from the emitter 111. The lens 112 is arranged such that the laser beam 101 emitted from the emitter 111 is radiated in accordance with the size of the modulation part 130 of the spatial light modulator 13. When the modulation region associated with the light source 11 is set in the modulation part 130, the lens 112 adjusts the radiation range of the laser beam 101 according to the size of the modulation part 130 of the spatial light modulator 13. The light 102 whose radiation range is adjusted by the lens 112 travels toward the modulation part 130 of the spatial light modulator 13. In the present example embodiment, an example in which the light source 11 includes a single emitter 111 and a lens 112 will be described. Practically, it is required to control the emitter 111 independently for each communication target. Therefore, the light source 11 includes a plurality of emitters 111 and a plurality of lenses 112 such that the number of communicable communication targets becomes the upper limit.

The wavelength of the laser beam 101 emitted from the emitter 111 is not particularly limited, and may be selected according to the application. For example, the emitter 111 emits the laser beam 101 in the visible or infrared wavelength band. For example, in the case of near-infrared rays of 800 to 900 nanometers (nm), since the laser class can be increased, the sensitivity can be improved by about one digit as compared with other wavelength bands. For example, a high-output laser beam source can be used for infrared rays in a wavelength band of 1.55 micrometers (μm). As an infrared laser beam source in a wavelength band of 1.55 μm, an aluminum gallium arsenide phosphorus (AlGaAsP)-based laser beam source, an indium gallium arsenide (InGaAs)-based laser beam source, or the like can be used. The longer the wavelength of the laser beam 101 is, the larger the diffraction angle can be made and the higher the energy can be set.

The spatial light modulator 13 includes a modulation part 130. A plurality of modulation regions is set in the modulation part 130. Each of the plurality of modulation regions is associated with each of the plurality of communication targets. In each of the plurality of modulation regions, a pattern (phase image) for each spatial light signal transmitted to the communication target related to each of the plurality of modulation regions is set. When the modulation part 130 of the spatial light modulator 13 is radiated with the light 102 in a state where the phase image is set in the modulation part 130, the radiated light 102 is modulated. The modulated light 103 of the light 102 radiated to the modulation part 130 is projected as projection light 105. The modulated light 103 (projection light 105) for each communication target is emitted from each of the plurality of modulation regions. For example, the modulated light 103 (projection light 105) emitted from each of the plurality of modulation regions is displayed as a dot-shaped image (also referred to as a dot image) at a position of a communication target associated with each modulation region.

For example, the spatial light modulator 13 is implemented by a spatial light modulator using ferroelectric liquid crystal, homogeneous liquid crystal, vertical alignment liquid crystal, or the like. For example, the spatial light modulator 13 can be implemented by liquid crystal on silicon (LCOS). Furthermore, the spatial light modulator 13 may be implemented by a micro electro mechanical system (MEMS). In the phase modulation-type spatial light modulator 13, the energy can be concentrated on the portion of the image by operating to sequentially switch the portion on which the projection light 105 is projected. Therefore, in the case of using the phase modulation-type spatial light modulator 13, if the output of the light source 11 is the same, the image can be displayed brighter than other methods.

FIGS. 3 to 6 are conceptual diagrams illustrating an example of a modulation region set in the modulation part 130 of the spatial light modulator 13. In order to cope with a plurality of communication targets, a plurality of modulation regions is set in the modulation part 130. In the present example embodiment, one example of the emitter 111 included in the light source 11 is shown, but in practice, a plurality of emitters 111 is preferably included in the light source 11. When the light source includes the plurality of emitters 111, the light 102 radiated to the plurality of modulation regions can be independently controlled.

Figure 3:
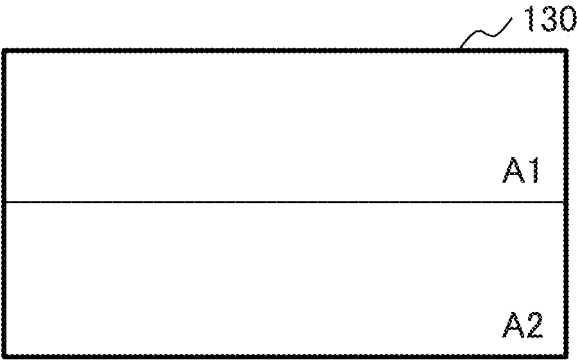
FIG. 3 is a conceptual diagram illustrating an example of a modulation region allocated to a modulation part of a spatial light modulator of the optical transmission device included in the communication device according to the first example embodiment.

FIG. 3 illustrates an example in which two modulation regions (modulation regions A1 and A2) are set in the modulation part 130. When there are two communication targets, the modulation part 130 may be divided into at least two modulation regions as illustrated in FIG. 3.

Figure 4:
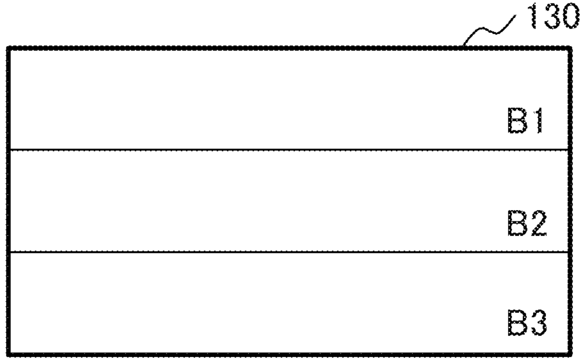
FIG. 4 is a conceptual diagram illustrating an example of a modulation region allocated to a modulation part of a spatial light modulator of the optical transmission device included in the communication device according to the first example embodiment.

FIG. 4 illustrates an example in which three modulation regions (modulation regions B1, B2, and B3) are set in the modulation part 130. When there are three communication targets, the modulation part 130 may be divided into at least three modulation regions as illustrated in FIG. 4.

Figure 5:
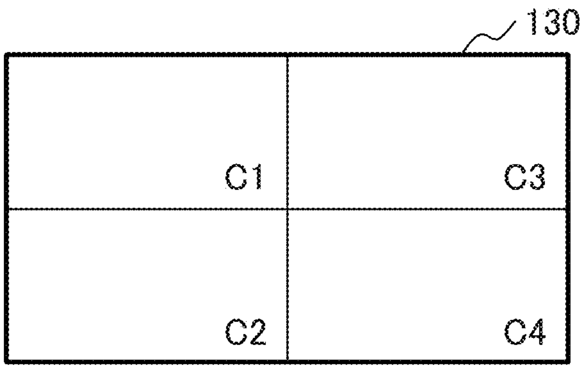
FIG. 5 is a conceptual diagram illustrating an example of a modulation region allocated to a modulation part of a spatial light modulator of the optical transmission device included in the communication device according to the first example embodiment.

FIG. 5 illustrates an example in which four modulation regions (modulation regions C1, C2, C3, and C4) are set in the modulation part 130. In a case where there are four communication targets, the modulation part 130 may be divided into at least four modulation regions as illustrated in FIG. 5.

Figure 6:
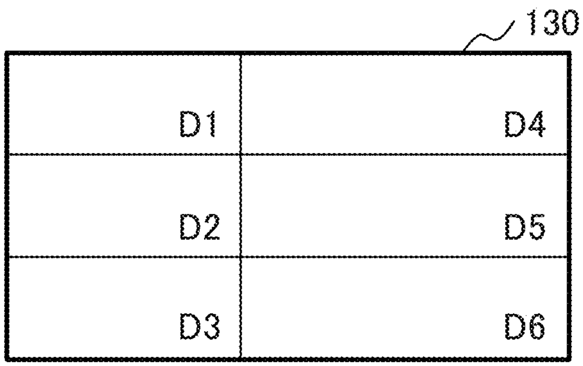
FIG. 6 is a conceptual diagram illustrating an example of a modulation region allocated to a modulation part of a spatial light modulator of the optical transmission device included in the communication device according to the first example embodiment.

FIG. 6 illustrates an example in which six modulation regions (modulation regions D1, D2, D3, D4, D5, and D6) are set in the modulation part 130. In a case where the number of communication targets is six, the modulation part 130 may be divided into at least six modulation regions as illustrated in FIG. 6.

FIGS. 3 to 6 are examples of division of the modulation part 130, and do not limit the number of divisions of the modulation part 130, the area of each modulation region, and the shape of each modulation region. The number of divisions of the modulation part 130, the area of each modulation region, and the shape of each modulation region can be arbitrarily set. In the modulation region associated with the communication target, a phase image related to the image formed by the projection light 105 projected toward the communication target is set. For example, the phase image may not be set in the modulation region with which the communication target is not associated.

Figure 7:
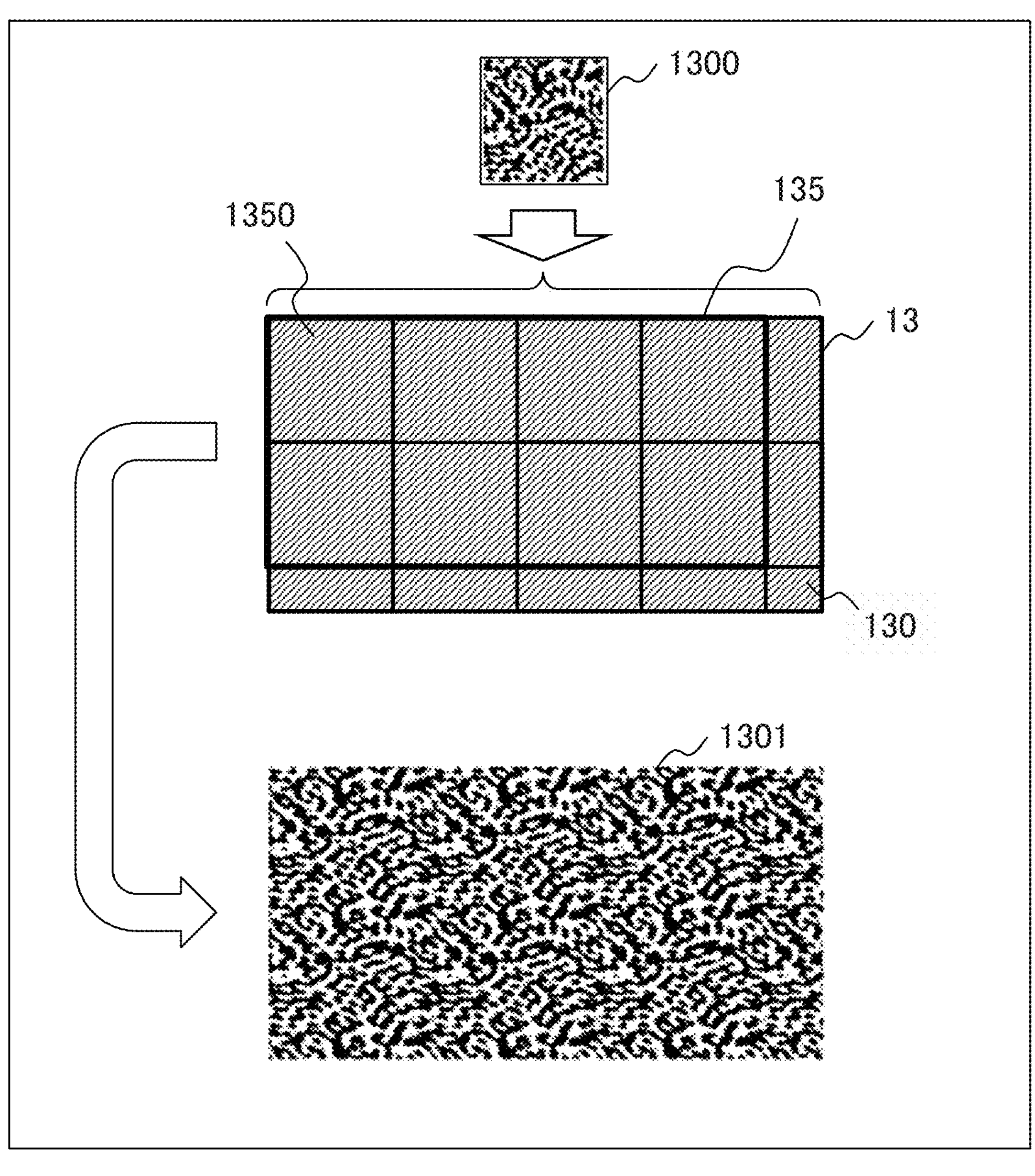
FIG. 7 is a conceptual diagram illustrating an example of tiling of a modulation region allocated to a modulation part of a spatial light modulator of the optical transmission device included in the communication device according to the first example embodiment.

FIG. 7 is a conceptual diagram for describing a pattern (phase image) set in the modulation region 135 allocated to the modulation part 130 of the spatial light modulator 13. The modulation region 135 allocated to the modulation part 130 of the spatial light modulator 13 is divided into a plurality of regions (also referred to as tiles 1350). For example, the modulation region 135 is divided into rectangular tiles 1350 having a desired aspect ratio. Each of the plurality of tiles 1350 includes a plurality of pixels. A phase image 1300 of the image formed by the projection light 105 projected toward the communication target associated with the modulation region 135 is allocated to each of the plurality of tiles 1350 set in the modulation region 135. For example, a phase image generated in advance is set in each of the plurality of tiles 1350. The phase image 1300 related to the image projected toward the communication target associated with the modulation region 135 including the tiles 1350 is set to each of the plurality of tiles 1350. For example, the same phase image 1300 is allocated to each of the plurality of tiles 1350 included in the same modulation region 135 in which the phase image 1300 for displaying a dot image at a position of a communication target is set to each of the plurality of tiles 1350. A set of phase images 1300 allocated to the plurality of tiles 1350 forms a phase image 1301. In other words, the phase image 1301, which is a set of phase images 1300 in which image information to be displayed on the projection target by the projection light 105 is written, is set in the modulation region 135.

Figure 8:
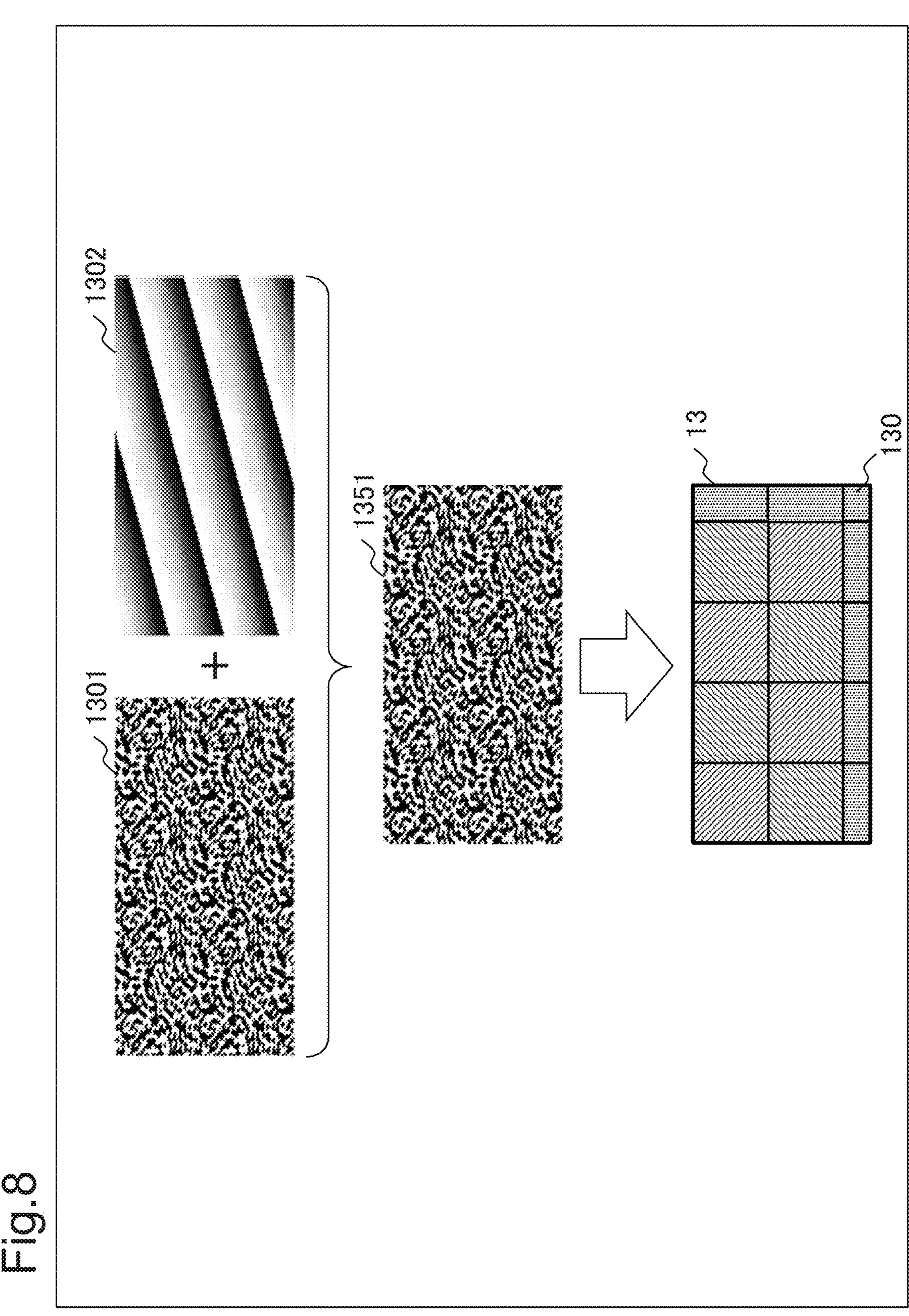
FIG. 8 is a conceptual diagram illustrating an example of a pattern set in a modulation region allocated to a modulation part of a spatial light modulator of the optical transmission device included in the communication device according to the first example embodiment.

FIG. 8 is a conceptual diagram illustrating an example of a pattern (phase image) set in the modulation part 130 of the spatial light modulator 13. A composite image 1351 of the phase image 1301 and the shift image 1302 is set in the modulation part 130. The phase image 1301 is a pattern for forming a desired image. The shift image 1302 is a pattern in which the position of the image displayed by the projection light 105 using the phase image 1301 is two-dimensionally moved. For example, the shift image 1302 is set to move the image in accordance with the output profile of the modulated light 103 emitted from the modulation part 130 of the spatial light modulator 13. When the shift image 1302 is combined, the image displayed by the projection light using the phase image 1301 can be shifted in the horizontal direction or the vertical direction. For example, when the modulated light 103 (projection light 105) is enlarged and projected, a projection optical system such as a Fourier transform lens or a projection lens may be used. For example, the composite image 1351 generated in advance may be stored in a storage unit (not illustrated). FIG. 8 is an example, and the patterns of the phase image 1301, the shift image 1302, and the composite image 1351 are not limited.

Figure 9:
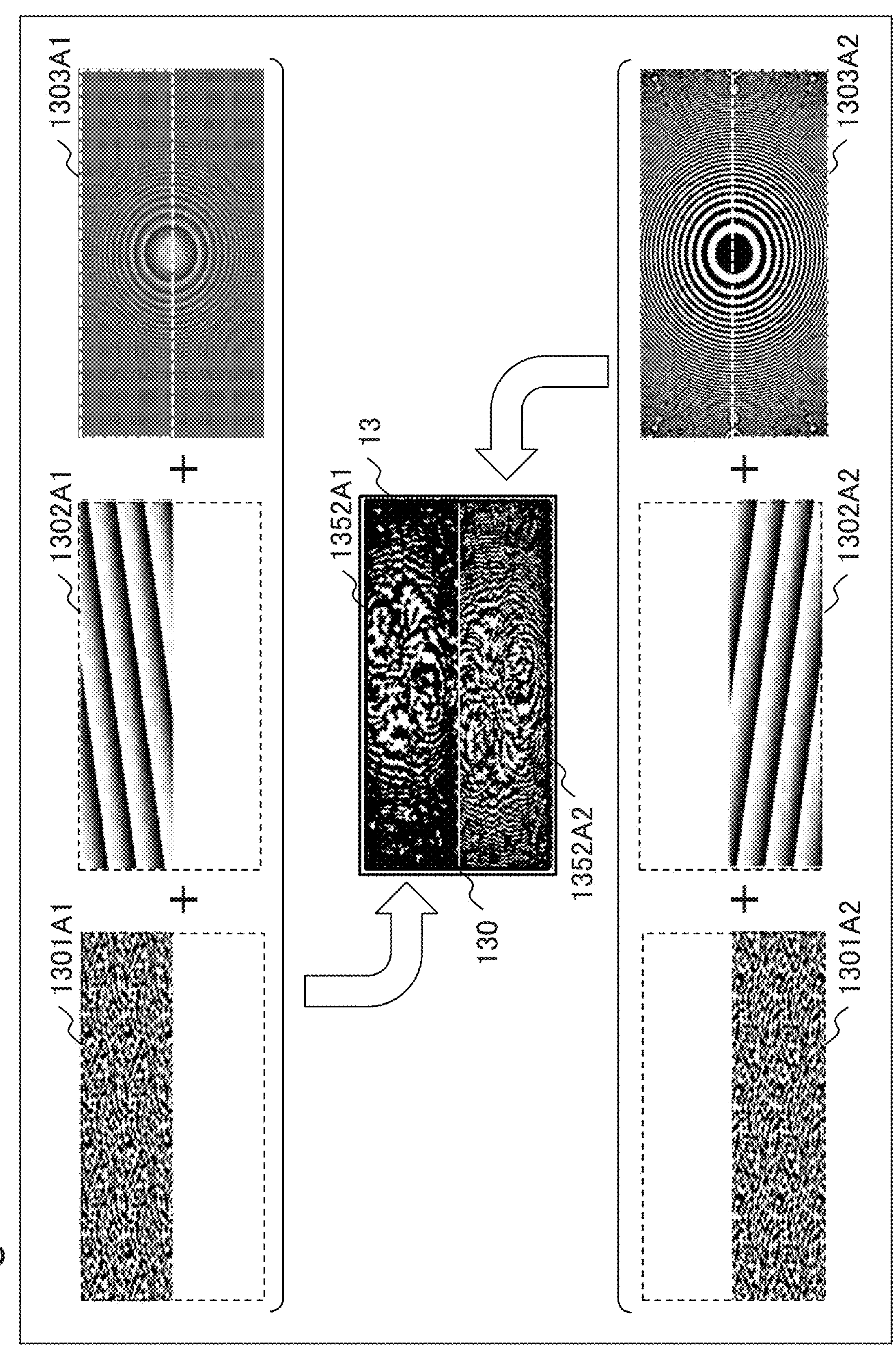
FIG. 9 is a conceptual diagram illustrating another example of the pattern set in the modulation region allocated to the modulation part of the spatial light modulator of the optical transmission device included in the communication device according to the first example embodiment.

FIG. 9 is a conceptual diagram illustrating another example of the pattern (phase image) set in the modulation part 130 of the spatial light modulator 13. FIG. 9 illustrates an example using a virtual lens image. The wavefront of light can be controlled by phase control, similar to diffraction. When the phase changes to a spherical shape, a spherical difference is generated in the wavefront, and a lens effect is generated. The virtual lens image changes the phase of the light 102 radiated to the modulation part 130 of the spatial light modulator 13 into a spherical shape, and generates a lens effect of condensing the light on a condensing point having a predetermined focal length. When the virtual lens image is used, a projection optical system such as a Fourier transform lens or a projection lens can be omitted. The example of FIG. 9 is an example in which the modulation part 130 is divided into two upper and lower modulation regions as illustrated in FIG. 3. FIG. 9 is a conceptual example, and does not accurately represent patterns of a virtual lens image, a shift image, and a phase image that are actually used.

A composite image 1301A1 of a phase image 1302A1, a shift image 1352A1, and a virtual lens image 1303A1 is set in a modulation region (also referred to as a modulation region A1) on the upper side of the modulation part 130. The phase image 1301A1 and the shift image 1302A1 are set in accordance with the modulation region A1. The virtual lens image 1303A1 is a pattern for condensing light forming an image based on the phase image 1301A1 and the shift image 1302A1 on a condensing point of the virtual lens image 1303A1. The virtual lens image 1303A1 is set in accordance with the entire modulation part 130. As the virtual lens image 1303A1, a portion overlapping the phase image 1301A1 and the shift image 1302A1 (a portion within a range of a white broken line) is used. A composite image 1301A2 of a phase image 1302A2, a shift image 1352A2, and a virtual lens image 1303A2 is set in a modulation region (also referred to as a modulation region A2) on the lower side of the modulation part 130. The phase image 1301A2 and the shift image 1302A2 are set in accordance with the modulation region A2. The virtual lens image 1303A2 is a pattern for condensing light forming an image based on the phase image 1301A2 and the shift image 1302A2 on a condensing point of the virtual lens image 1303A2. The virtual lens image 1303A2 is set in accordance with the entire modulation part 130. As the virtual lens image 1303A2, a portion overlapping the phase image 1301 A2 and the shift image 1302A2 (a portion within a range of a white broken line) is used. In the example of FIG. 9, two modulation regions are set in the modulation part 130. An arbitrary number of modulation regions can be set in the modulation part 130. An individual composite image 1352 related to each modulation region is set in each of the plurality of modulation regions set in the modulation part 130.

When the modulation part 130 is radiated with light 102 in a state in which patterns (phase images) such as the composite image 1351, the composite image 1352A, and the composite image 1352B are set in the modulation part 130, the modulation part 130 of the spatial light modulator 13 emits modulated light 103. For example, the modulated light 103 that forms an image related to the phase image 1300 of each tile 1350 is emitted from the modulation part 130 of the spatial light modulator 13. As the number of tiles 1350 set in the modulation part 130 increases, a clear image can be displayed. On the other hand, when the number of pixels of each tile 1350 decreases, the resolution decreases. Therefore, the size and the number of tiles 1350 set in the modulation part 130 are set according to the application.

In the modulation part 130 of the spatial light modulator 13, a plurality of modulation regions 135 is set in association with a plurality of communication targets. In each of the plurality of modulation regions 135, a phase image related to an image displayed by the projection light 105 projected on the associated communication target is set. The projection light 105 for displaying images of the same shape may be projected on each of the plurality of modulation regions 135, or the projection light 105 for displaying images of different shapes may be projected. In the present example embodiment, it is desirable that the projection light 105 having the same power as much as possible be projected toward the communication targets located at different distances/directions from the communication device 1. Therefore, the position where the image is displayed and the shape of the image to be displayed are set so that the projection light 105 having the same power as much as possible is projected for each communication target.

The control unit 14 controls the light source 11 and the spatial light modulator 13 according to the light transmission instruction acquired from the communication control device 19. For example, the control unit 14 is implemented by a microcomputer including a processor and a memory. The control unit 14 sets a phase image related to the projected image in each of the plurality of modulation regions 135 allocated to the modulation part 130 in accordance with the aspect ratio of the modulation region set in the modulation part 130 of the spatial light modulator 13. For example, the control unit 14 sets a phase image related to an image suitable for optical space communication in each of the plurality of modulation regions 135 allocated to the modulation part 130. The phase image of the projected image may be stored in advance in a storage unit (not illustrated). The shape and size of the image to be projected are not particularly limited.

The control unit 14 sets a pattern (phase image) related to the image formed by the projection light 105 in the modulation part 130 of the spatial light modulator 13. The control unit 14 sets a phase image for each tile allocated to the modulation part 130 of the spatial light modulator 13. The control unit 14 sets the phase image in the modulation part 130 by driving the spatial light modulator 13 such that a parameter that determines a difference between a phase of the light 102 radiated to the modulation part 130 of the spatial light modulator 13 and a phase of the modulated light 103 reflected by the modulation part 130 changes. The parameter that determines the difference between the phase of the light 102 radiated to the modulation part 130 of the spatial light modulator 13 and the phase of the modulated light 103 reflected by the modulation part 130 is, for example, a parameter regarding optical characteristics such as a refractive index and an optical path length. For example, the control unit 14 adjusts the optical characteristics of the modulation part 130 by changing the voltage applied to the modulation part 130 of the spatial light modulator 13. The phase distribution of the light 102 radiated to the modulation part 130 of the phase modulation-type spatial light modulator 13 is modulated according to the optical characteristics of the modulation part 130. A method of driving the spatial light modulator 13 by the control unit 14 is determined according to the modulation scheme of the spatial light modulator 13.

The control unit 14 drives the emitter 111 of the light source 11 in a state where the phase image related to the image to be displayed is set in the modulation part 130. The control unit 14 drives the emitter 111 included in the light source 11 in accordance with the timing of transmitting the spatial light signal. As a result, the light 102 emitted from the light source 11 is radiated to the plurality of modulation regions 135 allocated to the modulation part 130 of the spatial light modulator 13 in accordance with the timing at which the phase image is set in the modulation part 130 of the spatial light modulator 13. The light 102 radiated to each of the plurality of modulation regions 135 allocated to the modulation part 130 of the spatial light modulator 13 is modulated according to the phase image set in each of the plurality of modulation regions 135. The modulated light 103 modulated by the modulation part 130 of the spatial light modulator 13 is projected as projection light 105.

For example, a projection unit that enlarges and projects the modulated light 103 as the projection light 105 may be disposed on an optical path of the modulated light 103. For example, the projection unit is implemented by a projection optical system including a Fourier transform lens and a projection lens. For example, the projection unit is implemented by a curved mirror having a curved reflecting surface that enlarges and reflects modulated light 103. Details of the projection unit will not be described.

For example, a shield that allows the modulated light 103 (projection light 105) forming a desired image to pass through and shields unnecessary light components may be disposed on an optical path of the modulated light 103 (projection light 105). For example, the shield shields 0th-order light or a ghost image included in the modulated light 103 (projection light 105). For example, the shield is an aperture in which a slit-shaped opening is formed in a portion through which light forming a desired image passes. For example, the shield is a frame that shields an unnecessary light component included in the modulated light 103 (projection light 105) and defines an outer edge of a display region of the projection light 105. For example, a 0th-order light remover that removes 0th-order light may be disposed on an optical path of the modulated light 103 (projection light 105). For example, the 0th-order light remover includes a light absorbing element supported by an element that supports the light absorbing element. The light absorbing element is fixed on an optical path of 0th-order light included in the modulated light 103 (projection light 105) by the support element. For example, the support element is made of a material such as glass or plastic through which the modulated light 103 (projection light 105) is transmitted. For example, a black body such as carbon is used for the light absorbing element. When the wavelength of the laser beam 101 to be used is fixed, it is preferable to use a light absorbing element made of a material that selectively absorbs light having the wavelength of the laser beam 101.

Projection Example

Figure 10:
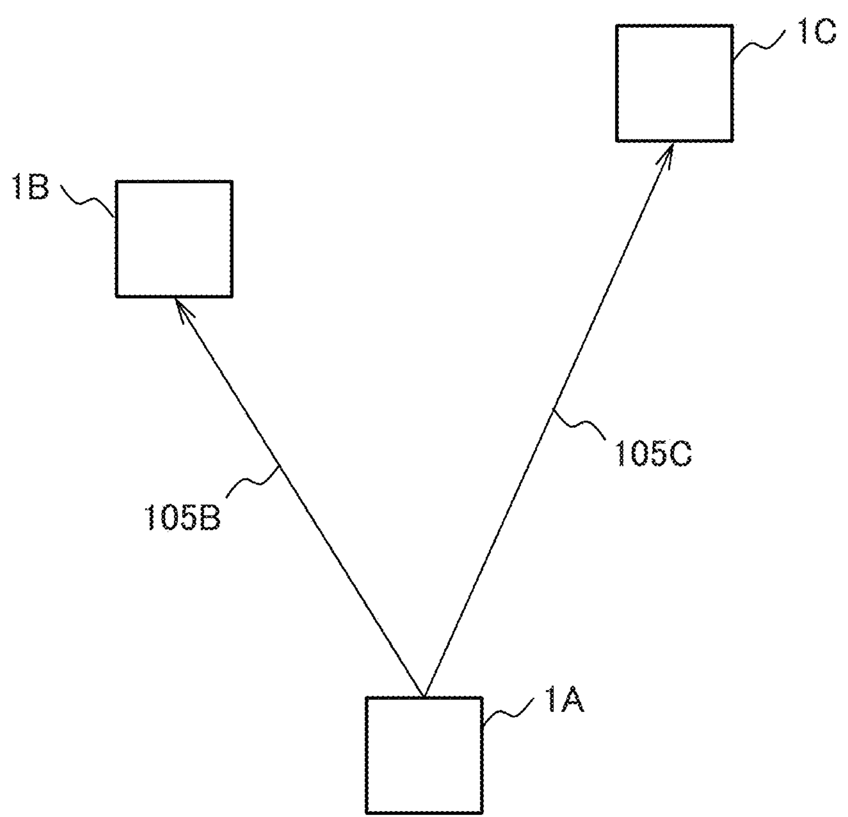
FIG. 10 is a conceptual diagram for explaining optical space communication between communication devices in the first example embodiment.

FIG. 10 illustrates an example in which projection light 105 is projected from the optical transmission device 10 toward a plurality of communication devices 1 to be communicated. In the example of FIG. 10, projection light 105B is projected from the communication device 1A toward the communication device 1B, and projection light 105C is projected toward the communication device 1C. The communication device 1B and the communication device 1C are located at different distances/directions when viewed from the communication device 1A.

Figure 11:
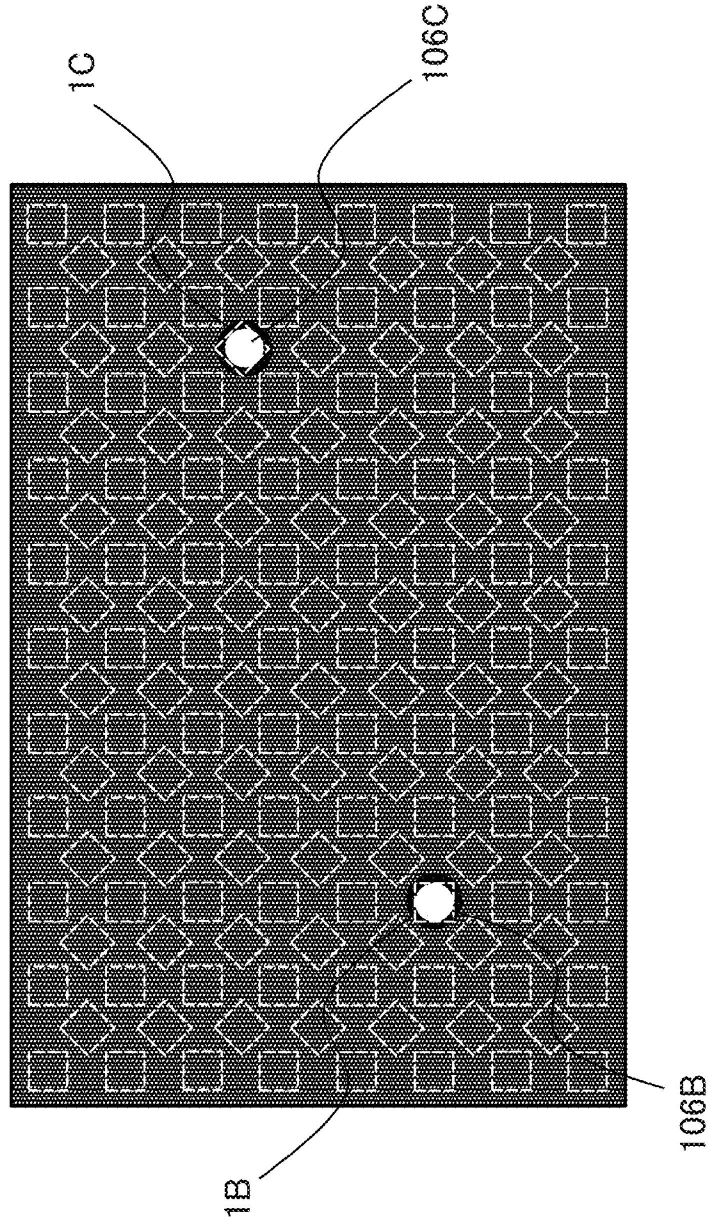
FIG. 11 is a conceptual diagram for describing a position of an image displayed by projection light transmitted by the communication device in the first example embodiment.

FIG. 11 is a conceptual diagram for describing a position where pixels (dots) constituting an image are displayed by projection light 105B and projection light 105C projected from the communication device 1A in the positional relationship of FIG. 10. The projection light 105B and the projection light 105C are light that is allocated to the modulation part 130 of the spatial light modulator 13 of the communication device 1A and modulated by phase images set in different modulation regions 135. FIG. 11 illustrates a broken-line square (o) at a position where dots are displayed by projection light 105B, and a broken-line diamond (0) at a position where dots are displayed by projection light 105C. The communication device 1B is disposed at a position (u) where dots are displayed by the projection light 105B. Therefore, the communication device 1B is radiated with an image including the dot 106B. The communication device 1C is arranged at a position (0) where dots are displayed by the projection light 105C. Therefore, the communication device 1C is radiated with an image including the dot 106C. In FIG. 11, the area of the dot 106B at the position of the communication device 1B is the same as the area of the dot 106C at the position of the communication device 1C, but in practice, these areas are different depending on the distance from the communication device 1A and the position.

As illustrated in FIG. 11, the image including the dot 106B displayed by the projection light 105B projected from the communication device 1A is radiated to the communication device 1B, but is not radiated to the communication device 1C. On the other hand, the image including the dot 106C displayed by the projection light 105C projected from the communication device 1A is radiated to the communication device 1C, but is not radiated to the communication device 1C. According to the present example embodiment, by setting the modulation region 135 for each communication target in the modulation part 130 of the spatial light modulator 13, even the plurality of communication devices 1 out of the radiation range in a case where the single modulation region 135 is used can be simultaneously radiated with the spatial light signal.

Comparative Example 1

Figure 12:
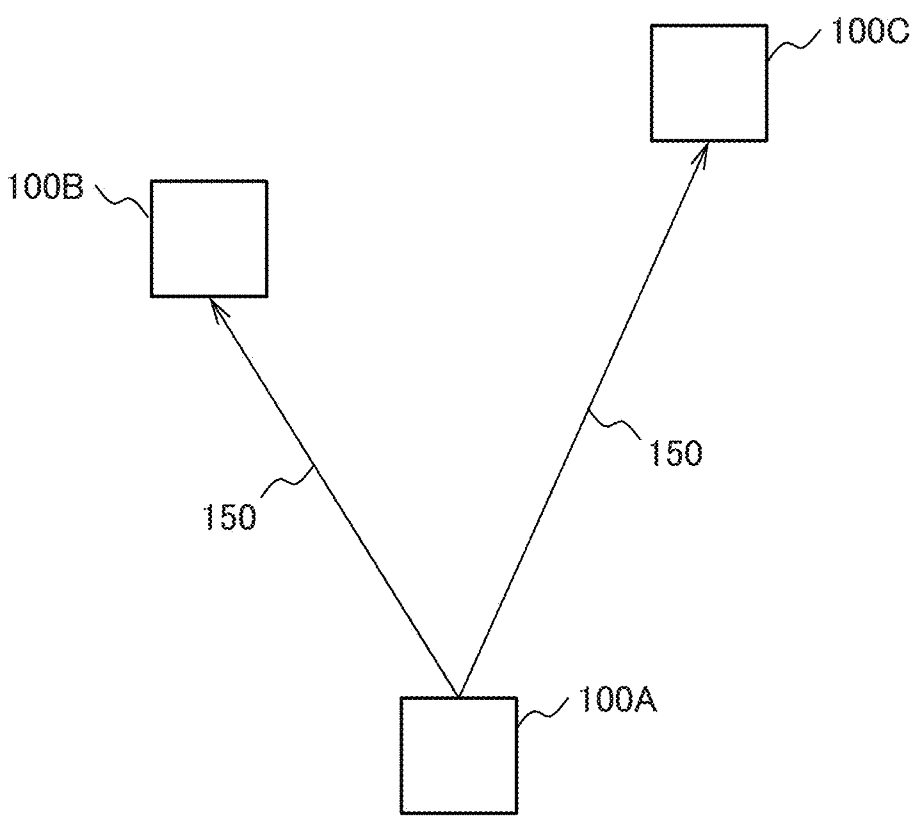
FIG. 12 is a conceptual diagram for explaining optical space communication between communication devices in Related Art 1.

Here, Comparative Example 1 including the problem to be solved in the present example embodiment will be described. Comparative Example 1 has a problem that it is difficult to simultaneously radiate a plurality of communication targets with a spatial light signal due to a positional relationship among the communication targets. FIG. 12 is a conceptual diagram illustrating an example of projection of the projection light in the present comparative example. In the example of FIG. 12, projection light 150 is projected from the communication device 100A toward the communication device 100B and the communication device 100C. The communication device 100B and the communication device 100C are located at different distances/directions when viewed from the communication device 100A. The communication device 100A also includes a spatial light modulator (not illustrated) similar to that of the present example embodiment. However, only a single modulation region is set in the modulation part of the spatial light modulator of the communication device 100A.

Figure 13:
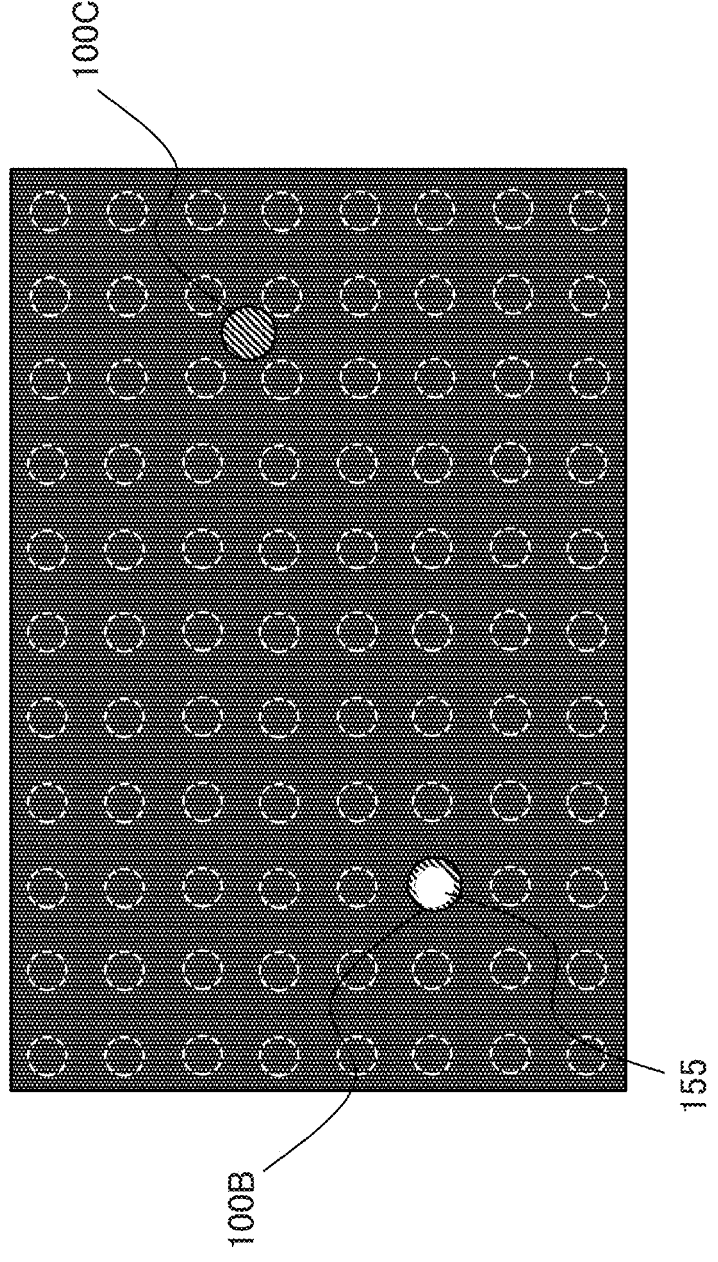
FIG. 13 is a conceptual diagram for describing a position of an image displayed by projection light transmitted by a communication device in Related Art 1.

FIG. 13 is a conceptual diagram for describing a position where pixels (dots) constituting an image are displayed by projection light 150 projected from the communication device 100A in the positional relationship of FIG. 12. The projection light 150 is light modulated by the phase image set in the modulation part of the spatial light modulator of the communication device 100A. FIG. 13 illustrates a circle (2) of a broken line at a position where dots are displayed by projection light 105B. The communication device 1B is arranged at a position (2) where dots are displayed by the projection light 105B. Therefore, the communication device 1B is radiated with an image including the dot-shaped radiation pattern 155. On the other hand, the communication device 1C is not disposed at the position where the dot is displayed by the projection light 105C. Therefore, the communication device 1C is not radiated with an image including a dot.

As illustrated in FIG. 13, the image including the radiation pattern 155 displayed by the projection light 150 projected from the communication device 100A is radiated to the communication device 100B, but is not radiated to the communication device 100C. In order to stably perform optical space communication using a spatial optical signal, it is required to radiate an accurate position with a beam of accurate power. In order to communicate with a plurality of communication targets, it is required to project the projection light 150 according to the number of communication targets, but it is difficult to accurately align the radiation position of the projection light 150 with the position of the communication target. In a case where a phase modulation-type spatial light modulator is used, a gap is formed between pixels. In Comparative Example 1, since the position of the pixel constituting the image displayed by the projection light 150 is fixed, the communication device 100C at the position of the gap between the pixels is not radiated with the projection light 150. That is, as illustrated in FIG. 13, when the radiation pattern 155 is aligned with the communication device 1B, the communication device 1C deviates from the radiation position of the image including the radiation pattern 155. In the method of the present comparative example, since a single modulation region is set in the modulation part 130 of the spatial light modulator 13, a situation in which the spatial light signals cannot be simultaneously transmitted to the plurality of communication devices 100 may occur.

Comparative Example 2

Figure 14:
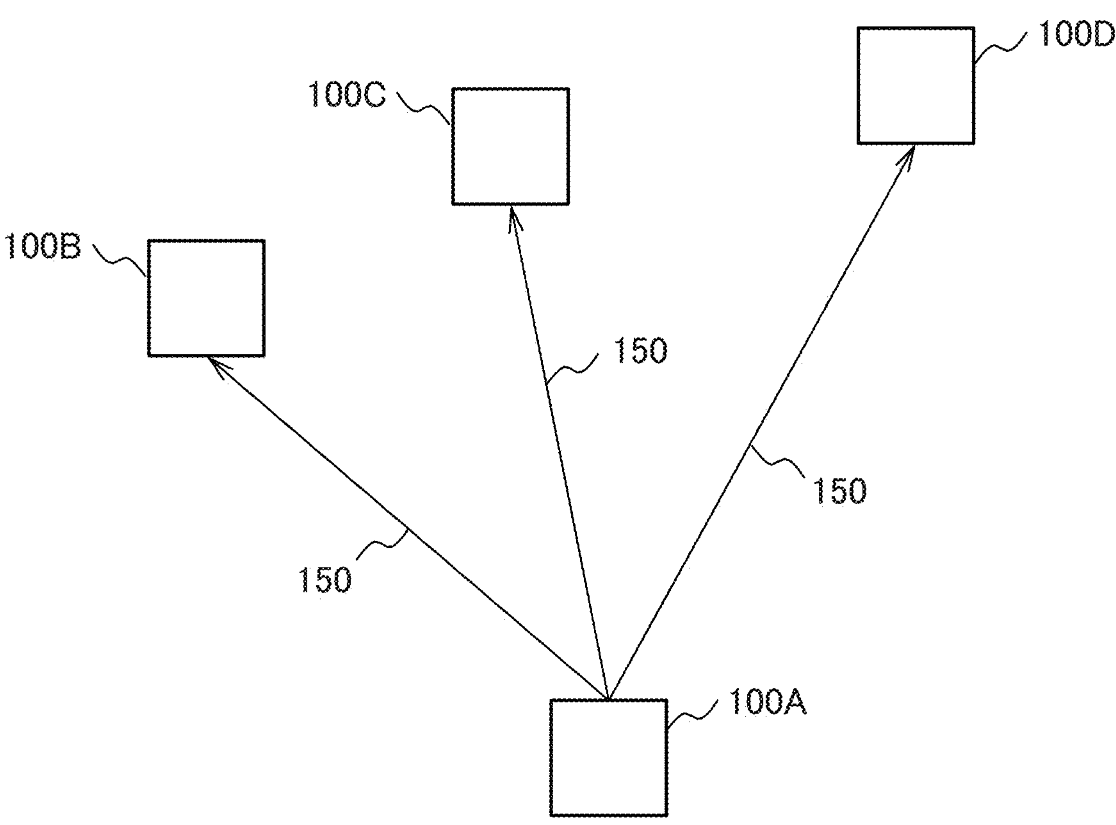
FIG. 14 is a conceptual diagram for explaining optical space communication between communication devices in Related Art 2.

Next, Comparative Example 2 including the problem to be solved in the present example embodiment will be described. The second comparative example has a problem that when a plurality of communication targets is simultaneously radiated with spatial light signals, the intensity of light radiated to the communication targets becomes unstable. FIG. 14 is a conceptual diagram illustrating an example of projection of the projection light in Comparative Example 2. In the example of FIG. 14, projection light 150 is projected from the communication device 100A toward the communication device 100B, the communication device 100C, and the communication device 100D. The communication device 100B, the communication device 100C, and the communication device 100D are located at different distances/directions as viewed from the communication device 100A. The communication device 100A also includes a spatial light modulator (not illustrated) similar to that of the present example embodiment. However, only a single modulation region is set in the modulation part of the spatial light modulator of the communication device 100A.

Figure 15:
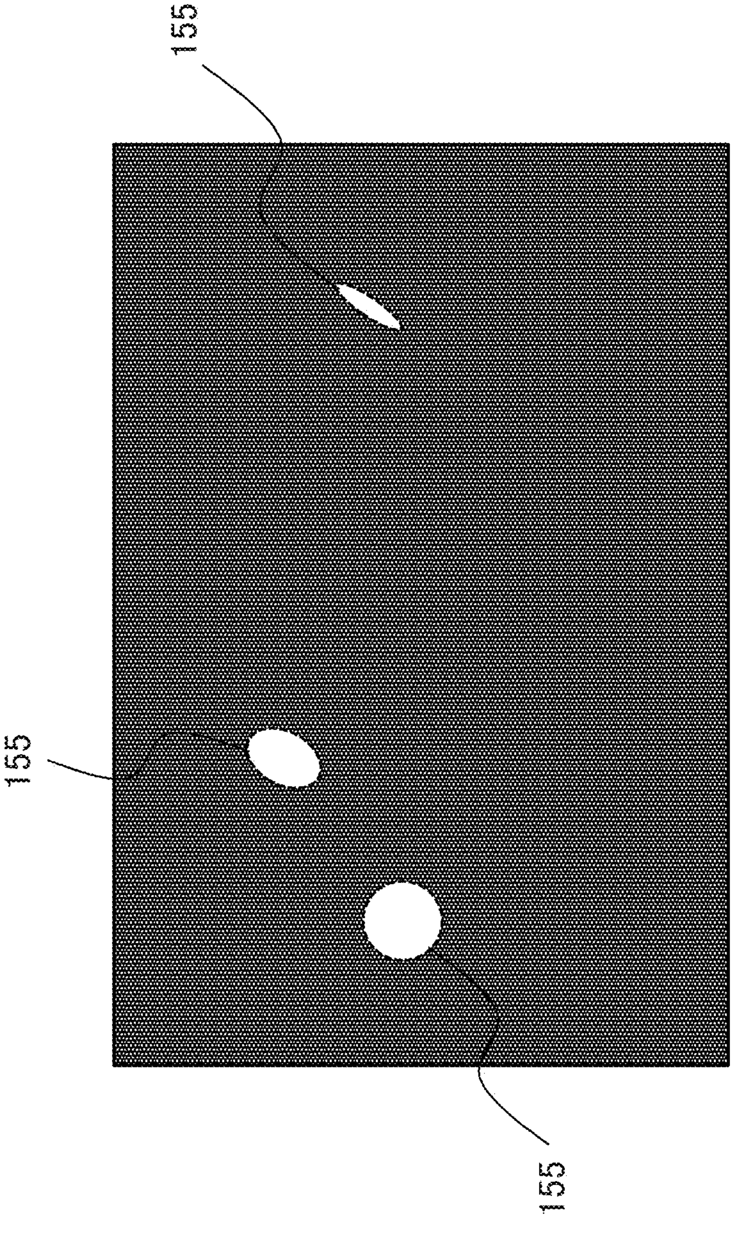
FIG. 15 is a conceptual diagram for describing a position of an image displayed by projection light transmitted by a communication device in Related Art 2.

FIG. 15 is a conceptual diagram illustrating an example of images displayed at positions of the communication device 100B, the communication device 100C, and the communication device 100D by the projection light 150 projected from the communication device 100A in the positional relationship of FIG. 14. The projection light 150 is light modulated by the phase image set in the modulation part of the spatial light modulator of the communication device 100A. In the example of FIG. 15, the phase image is set in the modulation part of the spatial light modulator of the communication device 100A such that the circular ( ) image (radiation pattern 155) is displayed at the position of the communication device 100B. The communication device 100A projects projection light 150 forming a circular ( ) image (radiation pattern 155) to the communication device 100B. In the example of FIG. 15, a distorted circular (elliptical) image is formed at the positions of the communication device 100C and the communication device 100D.

As illustrated in FIG. 15, the radiation pattern 155 displayed by the projection light 150 is radiated in different shapes/sizes at the respective positions of the communication device 100B, the communication device 100C, and the communication device 100D. In a case where a single modulation region is set in the modulation part of the spatial light modulator, the radiation pattern 155 radiated in each of the communication device 100B, the communication device 100C, and the communication device 100D divides the power of the laser beam emitted from the light source (not illustrated) according to the area thereof. For example, in a case where the communication with the communication device 100C is stopped, the power of the projection light 150 projected on the communication device 100B and the communication device 100D increases at once. When the radiation pattern 155 suddenly changes, the power of the projection light 150 also changes. Such a change in the power of the radiation pattern 155 is difficult to control even if the power of the light source is changed. Therefore, in the method of the present comparative example, in communication with a plurality of communication targets, a situation in which a spatial light signal having a stable intensity cannot be continuously transmitted may occur.

[Light Reception Device]

Figure 16:
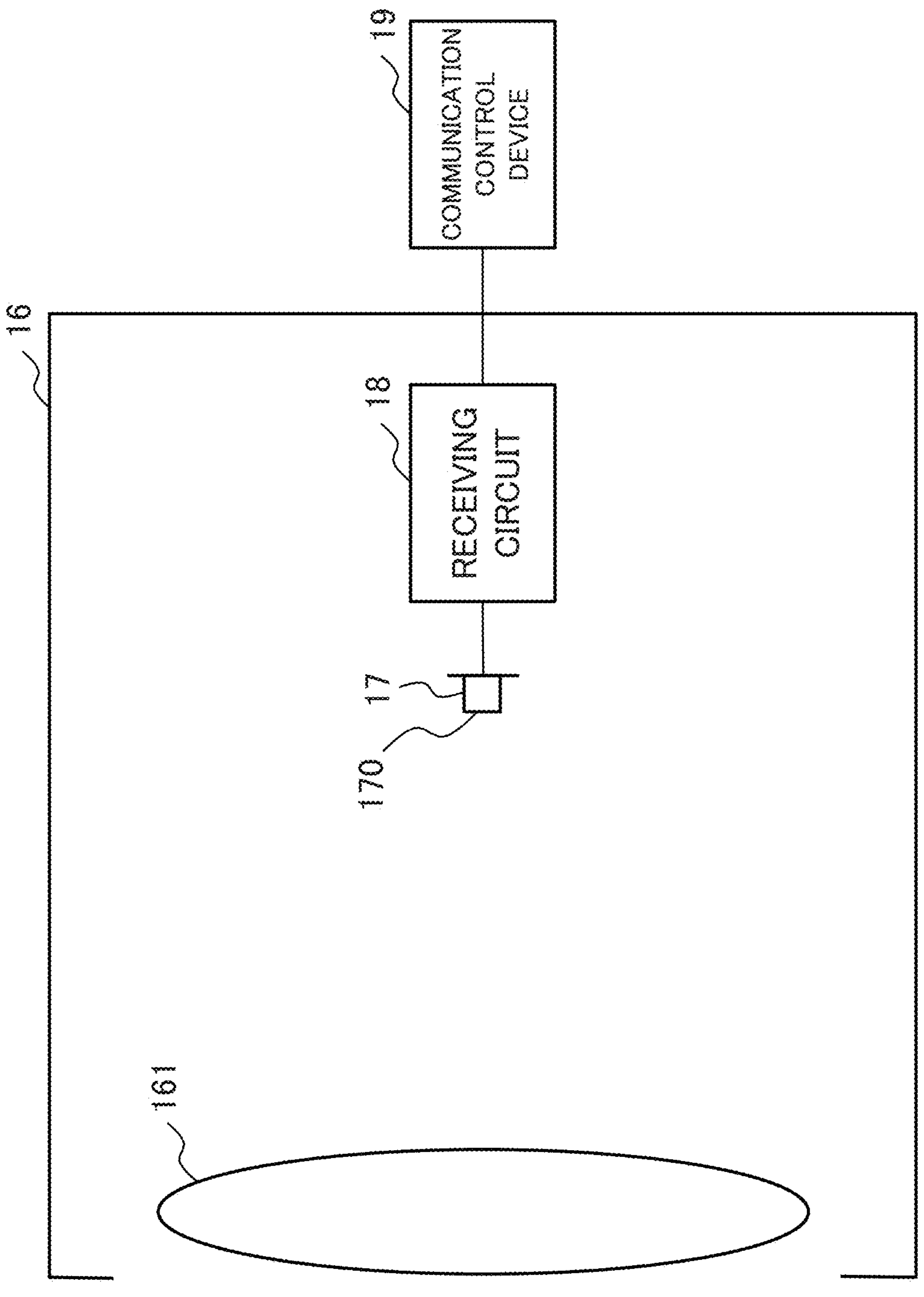
FIG. 16 is a block diagram illustrating an example of a light reception device included in the communication device according to the first example embodiment.

Next, a configuration of the light reception device 16 will be described with reference to the drawings. FIG. 16 is a conceptual diagram for describing a configuration of the light reception device 16. The light reception device 16 includes a concentrator 161, a light-receiving element 17, and a receiving circuit 18. FIG. 16 illustrates an example in which the light-receiving element 17 is a single element. The light reception device 16 is more practically includes the plurality of light-receiving elements 17. FIG. 16 is a plan view of the internal configuration of the light reception device 16 as viewed from above. The position of the receiving circuit 18 is not particularly limited. The receiving circuit 18 may be disposed inside the light reception device 16 or may be disposed outside the light reception device 16. Furthermore, the communication control device 19 may include the function of the receiving circuit 18.

The concentrator 161 is an optical element that collects a spatial light signal arriving from the outside. The spatial light signal is incident on the incident surface of the concentrator 161. The optical signal collected by the concentrator 161 is collected toward the region where the light-receiving element 17 is disposed. For example, the concentrator 161 is a lens that collects an incident spatial light signal. For example, the concentrator 161 is a light beam control element that guides the incident spatial light signal toward the light-receiving unit 170 of the light-receiving element 17. For example, the concentrator 161 may have a configuration in which a lens or a light beam control element is combined. The configuration of the concentrator 161 is not particularly limited as long as the spatial light signal can be condensed toward the region where the light-receiving element 17 is disposed. For example, a mechanism for guiding the optical signal collected by the concentrator 161 toward the light-receiving unit 170 of the light-receiving element 17 may be added.

The light-receiving element 17 receives light in a wavelength region of the spatial light signal to be received. For example, the light-receiving element 17 has sensitivity to light in the visible region. For example, the light-receiving element 17 has sensitivity to light in an infrared region. The light-receiving element 17 is sensitive to light having a wavelength in a 1.5 μm (micrometer) band, for example. The wavelength band of light with which the light-receiving element 17 has sensitivity is not limited to the 1.5 μm band. The wavelength band of the light received by the light-receiving element 17 can be arbitrarily set in accordance with the wavelength of the spatial light signal to be received. The wavelength band of the light received by the light-receiving element 17 may be set to, for example, a 0.8 μm band, a 1.55 μm band, or a 2.2 μm band. Furthermore, the wavelength band of the light received by the light-receiving element 17 may be, for example, a 0.8 to 1 μm band. A shorter wavelength band is advantageous for optical space communication during rainfall because absorption by moisture in the atmosphere is small. In addition, if the light-receiving element 17 is saturated with intense sunlight, the light-receiving element cannot read the optical signal derived from the spatial light signal. Therefore, a color filter that selectively passes the light of the wavelength band of the spatial light signal may be installed at the preceding stage of the light-receiving element 17. For example, in a case where polarized light is transmitted and received as a spatial light signal, a polarizing plate that selectively passes a spatial light signal in a polarization state of a light receiving object may be installed at a preceding stage of the light-receiving element 17. For example, in a case where spatial light signals of a specific wavelength band are transmitted and received, a band pass filter that selectively passes a spatial light signal of a wavelength band to be received may be installed at a preceding stage of the light-receiving element 17.

For example, the light-receiving element 17 can be implemented by an element such as a photodiode or a phototransistor. For example, the light-receiving element 17 is implemented by an avalanche photodiode. The light-receiving element 17 implemented by the avalanche photodiode can support high-speed communication. The light-receiving element 17 may be implemented by an element other than a photodiode, a phototransistor, or an avalanche photodiode as long as an optical signal can be converted into an electric signal. In order to improve the communication speed, the light-receiving unit of the light-receiving element 17 is preferably as small as possible. For example, the light-receiving unit of the light-receiving element 17 has a square light receiving surface having a side of about 5 mm (mm). For example, the light-receiving unit of the light-receiving element 17 has a circular light receiving surface having a diameter of about 0.1 to 0.3 mm. The size and shape of the light-receiving unit of the light-receiving element 17 may be selected according to the wavelength band, the communication speed, and the like of the spatial light signal.

The receiving circuit 18 acquires a signal output from each of the light-receiving elements 17. The receiving circuit 18 amplifies a signal from each of the light-receiving elements 17. The receiving circuit 18 decodes the amplified signal and analyzes a signal from the communication target. The signal decoded by the receiving circuit 18 is used for any purpose. The use of the signal decoded by the receiving circuit 18 is not particularly limited.

[Communication Control Device]

Figure 17:
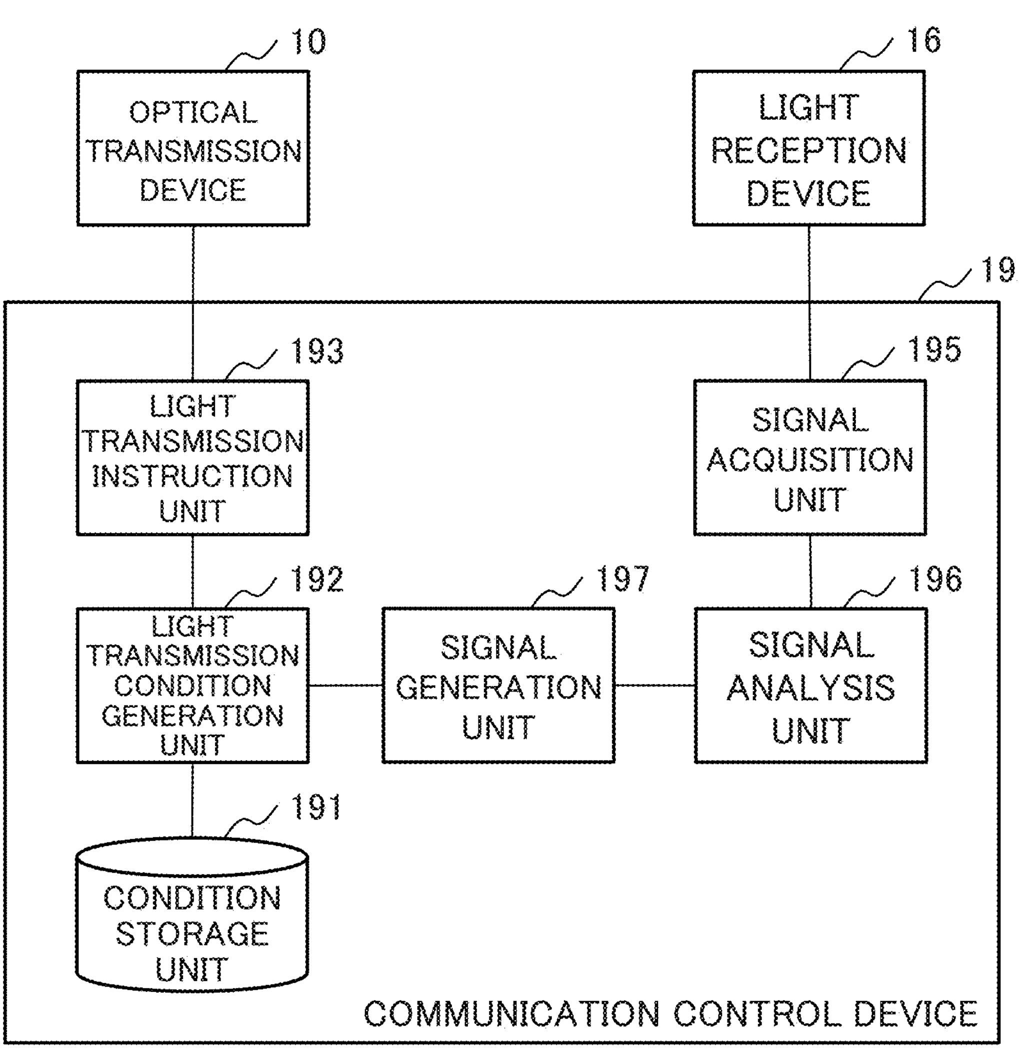
FIG. 17 is a block diagram illustrating an example of a light reception device included in the communication control device according to the first example embodiment.

Next, a configuration of the communication control device 19 will be described with reference to the drawings. FIG. 17 is a block diagram for describing an example of a configuration of the communication control device 19. The communication control device 19 includes a condition storage unit 191, a light transmission condition generation unit 192, a light transmission instruction unit 193, a signal acquisition unit 195, a signal analysis unit 196, and a signal generation unit 197. For example, the communication control device 19 is implemented by a microcomputer including a processor and a memory. The communication control device 19 may be mounted on a server or a cloud connected to the optical transmission device 10 or the light reception device 16 via a network.

The condition storage unit 191 stores patterns such as a phase image, a shift image, and a virtual lens image related to the projection light 105 to be transmitted to the optical transmission device 10. The pattern stored in the condition storage unit 191 is set in the modulation part 130 of the spatial light modulator 13. The condition storage unit 191 stores projection conditions including a light source control condition for controlling the light source 11 of the optical transmission device 10 and a modulator control condition for controlling the spatial light modulator 13 of the optical transmission device 10. The light source control condition is a condition including a timing at which the laser beam 101 is emitted from the light source 11 of the optical transmission device 10. The modulation part control condition is a condition for setting a pattern in the modulation part 130 of the spatial light modulator 13. By coordinating the light source control condition and the modulation part control condition, the projection light 105 related to the pattern set in the modulation part 130 of the spatial light modulator 13 is projected.

The light transmission condition generation unit 192 acquires a signal from the signal generation unit 197. The light transmission condition generation unit 192 generates a light transmission condition for transmitting information included in the acquired signal based on the condition stored in the condition storage unit 191. For example, the light transmission condition generation unit 192 selects a pattern for transmitting information included in the acquired signal based on the projection condition stored in the condition storage unit 191. For example, the light transmission condition generation unit 192 generates a light transmission condition for setting a pattern related to an image projected for transmitting information included in the acquired signal to the modulation part 130 of the spatial light modulator 13. For example, the light transmission condition generation unit 192 generates the light transmission condition for setting the phase image related to the projected image in the modulation part 130 of the spatial light modulator 13 in accordance with the aspect ratio of the modulation region set in the modulation part 130 of the spatial light modulator 13.

The light transmission instruction unit 193 outputs a light transmission instruction for controlling the light source 11 and the spatial light modulator 13 of the optical transmission device 10 to the optical transmission device 10 based on the light transmission condition set by the light transmission condition generation unit 192.

The signal acquisition unit 195 acquires the signal decoded by the light reception device 16 from the light reception device 16. In addition, the signal acquisition unit 195 acquires the signal to which the signal processing has been applied by the light reception device 16 from the light reception device 16. For example, the signal acquired by the signal acquisition unit 195 includes a scanned communication target or a response transmitted from a communication target in communication according to the spatial light signal transmitted from the communication device 1. The signal acquisition unit 195 outputs the acquired signal to the signal analysis unit 196.

The signal analysis unit 196 analyzes the signal acquired by the signal acquisition unit 195. For example, the signal analysis unit 196 analyzes information included in a signal according to the type of the signal. For example, the type of signal includes a scan signal and a communication signal. The type of the signal analyzed by the signal analysis unit 196 is not particularly limited. The signal analysis unit 196 outputs an analysis result of the signal to the signal generation unit 197.

The signal generation unit 197 acquires an analysis result of the signal by the signal analysis unit 196. The signal generation unit 197 generates a transmission signal according to an analysis result of the signal. The transmission signal includes a communication content with the communication target and a content used for scanning the communication target. The signal generation unit 197 generates a transmission signal for each communication target. The signal generation unit 197 generates a scan signal or a communication signal as a transmission signal. The scan signal is a signal used for scanning a communication target. The communication signal is a signal including information exchanged with a communication target. The signal generation unit 197 outputs the generated signal to the light transmission condition generation unit 192.

For example, the communication signal is a signal transmitted and received between the communication devices 1 in which communication is established when a communication path for transmitting and receiving a spatial optical signal is determined. The communication signal includes information to be transmitted toward the communication target. The information added to the communication signal may be predetermined content or content related to information included in the communication signal from the communication target. For example, in a case where a communication signal having contents related to information included in a communication signal from a communication target is generated, the information included in the communication signal transmitted from the communication target is displayed on a display device (not illustrated). For example, the operator who has confirmed the information displayed on the display device inputs a response to the displayed information to the communication control device 19 (signal generation unit 197) via an input device (not illustrated). For example, the signal generation unit 197 generates a communication signal including the input information. The information included in the communication signal is not particularly limited.

As described above, the communication device of the present example embodiment includes the optical transmission device, the light reception device, and the communication control device. The light reception device receives the spatial light signal transmitted from the included in the received spatial light signal. The communication control device acquires a signal decoded by the light reception device. The communication control device causes the optical transmission device to transmit a spatial light signal related to the acquired signal. The optical transmission device includes a light source, a spatial light modulator, and a control unit. The light source emits light. The spatial light modulator includes a modulation part to which light emitted from a light source is radiated. In the spatial light modulator, the phase of the radiated light is modulated by the modulation part. The control unit allocates the modulation region associated with each of the plurality of communication targets to the modulation part of the spatial light modulator. The control unit sets, as the modulation region, a phase image for forming an image used for communication with the communication target at a position of the communication target. The control unit sets, in each of the plurality of modulation regions allocated to the modulation part of the spatial light modulator, a phase image for displaying an image at a position of a communication target associated with each of the plurality of modulation regions. The control unit controls the light source so that the modulation part in which the phase image is set is radiated with light.

In the present example embodiment, a modulation region for each communication target is set in the modulation part of the spatial light modulator in association with each of the plurality of communication targets. In the modulation region, a phase image for each communication target is set. According to the present example embodiment, since the modulation region for each communication target is set in the modulation part, a stable spatial light signal can be transmitted to a plurality of communication targets. Furthermore, according to the present aspect, the spatial light signal can be accurately radiated toward the position of the communication target. Therefore, according to the present aspect, a spatial light signal for appropriately displaying an image (for example, dot images) used for communication can be transmitted to the communication target.

In one aspect of the present example embodiment, the control unit sets, for each of a plurality of communication targets, a phase image for displaying an image at a position of the communication target associated with each of the plurality of modulation regions in each of the plurality of modulation regions allocated to the modulation part of the spatial light modulator. According to the present aspect, the spatial light signal can be accurately radiated toward each position of the plurality of communication targets. Therefore, according to the present aspect, a spatial light signal for appropriately displaying an image (for example, a dot image) used for communication can be transmitted to each of the plurality of communication targets.

In one aspect of the present example embodiment, the control unit sets the composite image of the phase image and the shift image in each of the plurality of modulation regions allocated to the modulation part of the spatial light modulator. The phase image is a pattern for displaying an image. The shift image is a pattern for changing a display position of an image (for example, a dot image) at a position of a communication target associated with each of the plurality of modulation regions. According to the present aspect, the display position of the image can be changed to an arbitrary position inside the projection range by using the shift image.

In one aspect of the present example embodiment, the control unit sets the composite image of the phase image, the shift image, and the virtual lens image in each of the plurality of modulation regions allocated to the modulation part of the spatial light modulator. The phase image is a pattern for displaying an image. The shift image is a pattern for changing a display position of an image (for example, a dot image) at a position of a communication target associated with each of the plurality of modulation regions. The virtual lens image is a pattern for enlarging and projecting an image. According to the present aspect, the display position of the image can be changed to an arbitrary position inside the projection range using the shift image. According to the present aspect, the display position of the image can be changed to an arbitrary position inside the projection range by using the shift image. Furthermore, according to the present aspect, the image can be enlarged and projected by using the virtual lens image.

Second Example Embodiment

Next, a communication device according to a second example embodiment will be described with reference to the drawings. A communication device of the present example embodiment is different from that of the first example embodiment in that a modulation region allocated to a modulation part of a spatial light modulator is dynamically changed.

(Configuration)

Figure 18:
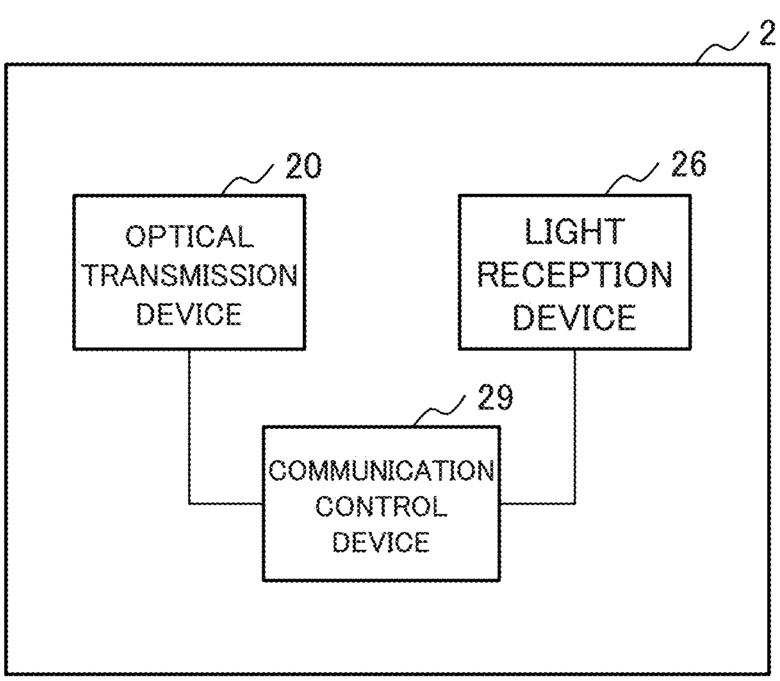
FIG. 18 is a block diagram illustrating an example of a configuration of a communication device according to a second example embodiment.

FIG. 18 is a block diagram illustrating an example of a configuration of the communication device 2 of the present example embodiment. The communication device 2 of the present example embodiment includes an optical transmission device 20, a light reception device 26, and a communication control device 29. The light reception device 26 and the communication control device 29 have the same configurations as those of the first example embodiment. Hereinafter, the description of the light reception device 26 and the communication control device 29 will be omitted, and the configuration of the optical transmission device 20 will be described in detail. In the present example embodiment, an example in which the light transmission condition of the spatial light signal is set by the optical transmission device 20 will be described. The light transmission condition of the spatial light signal may be set by the communication control device 29.

[Light Transmission Device]

Figure 19:
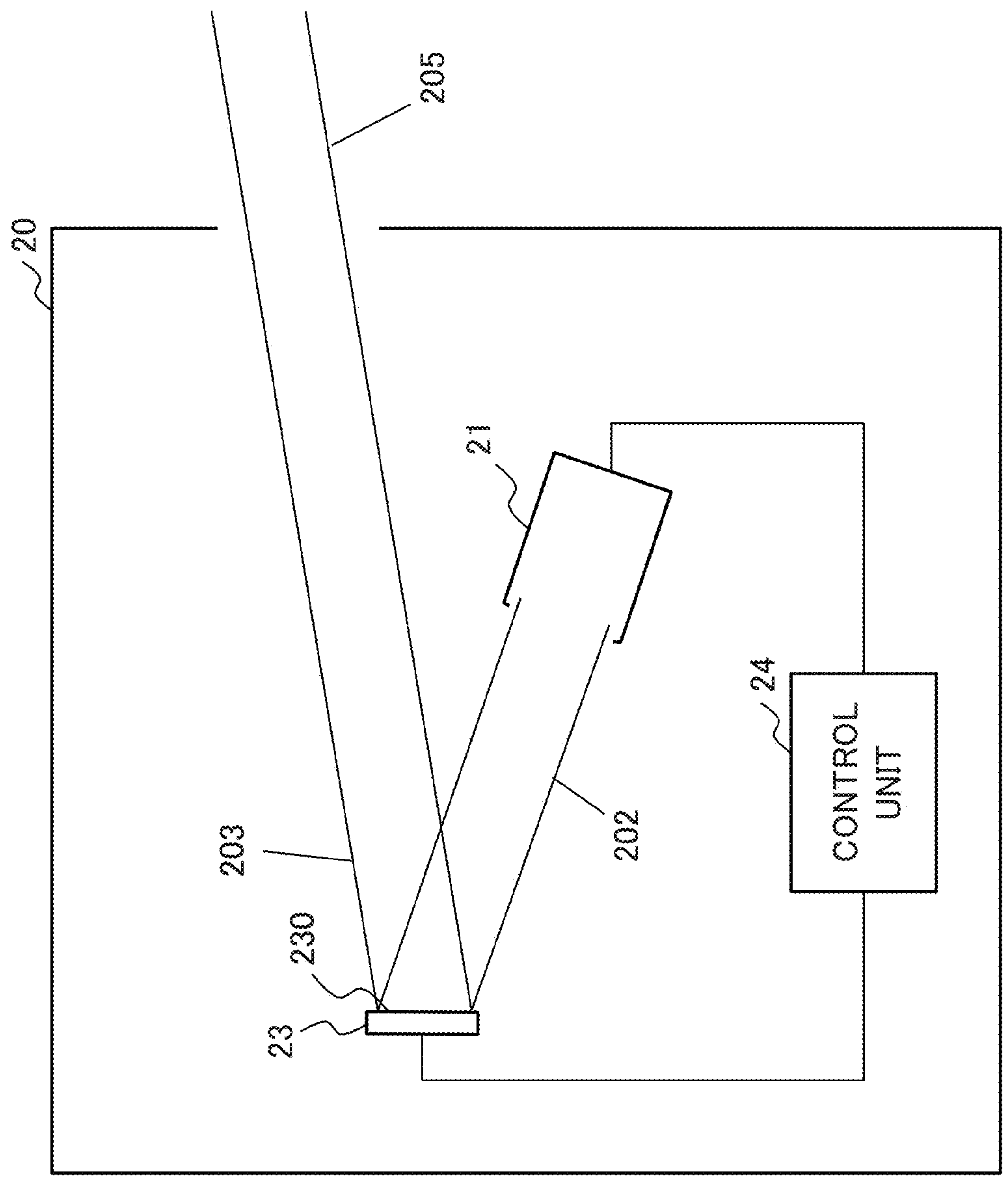
FIG. 19 is a conceptual diagram illustrating an example of a configuration of an optical transmission device included in a communication device according to the second example embodiment.

FIG. 19 is a conceptual diagram illustrating an example of a configuration of the optical transmission device 20. The optical transmission device 20 includes a light source 21, a spatial light modulator 23, and a control unit 24. The spatial light modulator 23 includes a modulation part 230. FIG. 19 is a side view of the internal configuration of the optical transmission device 20 as viewed from the lateral direction. FIG. 19 is conceptual, and does not accurately represent the positional relationship between the components, the traveling direction of light, and the like. The position of the control unit 24 is not particularly limited. The control unit 24 may be included in the communication control device 29. The light source 21 and the spatial light modulator 23 are similar to corresponding configurations in the first example embodiment. The control unit 24 has the same configuration as the corresponding configuration of the first example embodiment except for the method of allocating the modulation region to the modulation part 230 of the spatial light modulator 23. Hereinafter, a method of allocating the modulation region to the modulation part 230 of the spatial light modulator 23 by the control unit 24 will be focused and described.

Figure 20:
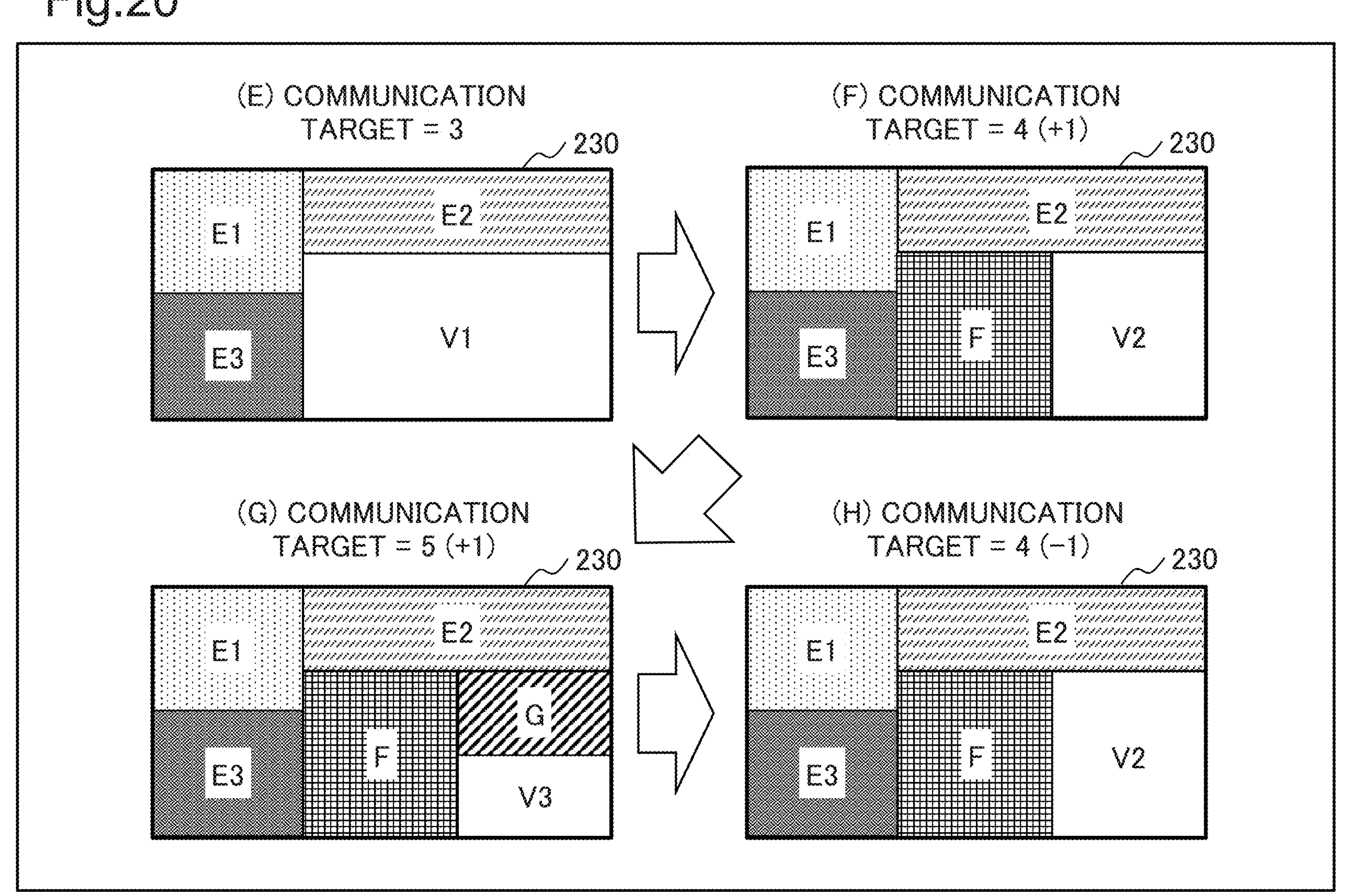
FIG. 20 is a conceptual diagram illustrating an example of allocation of a modulation region to a modulation part of a spatial light modulator of an optical transmission device included in a communication device according to the second example embodiment.

FIG. 20 is a conceptual diagram for describing a method of allocating a modulation region to the modulation part 130 of the spatial light modulator 13. The control unit 24 allocates at least one modulation region to the modulation part 230 according to the number of communication targets. When the modulation region is allocated to the modulation part 230, the control unit 24 sets at least one preliminary region (also referred to as a preliminary region) that is not allocated to the communication target. For example, a pattern (phase image) in which the modulated light 203 is not emitted according to the radiation of the light 202 is set in the preliminary region.

(E) of FIG. 20 illustrates an example of the modulation region allocation in the case that three communication targets are set. The control unit 24 sets modulation regions E1, E2, and E3 and a preliminary region V1 in the modulation part 230. The modulation regions E1, E2, and E3 and the preliminary region V1 are set in the modulation part 230. The modulation region E1, E2, and E3 are modulation regions associated with any communication target. The preliminary region V1 is a preliminary region that is not allocated to any communication target.

(F) of FIG. 20 illustrates an example of the modulation region allocation when the number of communication targets is increased from three to four. The control unit 24 divides the preliminary region V1 into a modulation region F and a preliminary region V2. The modulation regions E1, E2, E3, and F and the preliminary region V2 are set in the modulation part 130. The modulation regions E1, E2, E3, and F are modulation regions associated with any communication target. The preliminary region V2 is a preliminary region that is not allocated to any communication target.

(G) of FIG. 20 illustrates an example of the modulation region allocation when the number of communication targets increases from four to five. The control unit 24 divides the preliminary region V2 into a modulation region G and a preliminary region V3. The modulation regions E1, E2, E3, F, and G and the preliminary region V3 are set in the modulation part 130. The modulation regions E1, E2, E3, F, and G are modulation regions associated with any communication target. The preliminary region V3 is a preliminary region that is not allocated to any communication target.

(H) of FIG. 20 illustrates an example of the modulation region allocation when the number of communication targets is reduced from five to four. The control unit 24 sets a preliminary region V2 by integrating the modulation region G and the preliminary region V3. The preliminary region V2 is a region similar to (F) in FIG. 20. The modulation regions E1, E2, E3, and F and the preliminary region V2 are set in the modulation part 130. The modulation regions E1, E2, E3, and F are modulation regions associated with any communication target. The preliminary region V2 is a preliminary region that is not allocated to any communication target.

As described above, the control unit 24 dynamically changes the number of modulation regions allocated to the modulation part 230 of the spatial light modulator 23 according to the increase or decrease in the number of communication targets. When dynamically changing the modulation region, the control unit 24 sets a preliminary region that is not allocated to the communication target. The control unit 24 sets a new modulation region as a preliminary region according to an increase in communication targets. The control unit 24 integrates one of the modulation regions into the preliminary region according to the decrease in the number of communication targets. In other words, the control unit 24 increases or decreases the number of modulation regions set as the preliminary region of the modulation part 230 of the spatial light modulator 23 according to the increase or decrease of the communication target. For example, the control unit 24 can change the number of modulation regions allocated to the modulation part 230 of the spatial light modulator 23 for each projection opportunity of the projection light 205. For example, the control unit 24 may change the area of the modulation region according to the output profile of the modulated light 203 emitted from the modulation part 230 of the spatial light modulator 23. For example, the control unit 24 sets the area of each of the plurality of modulation regions so that the power of each of the plurality of modulation regions becomes uniform according to the output profile.

As described above, the communication device of the present example embodiment includes the optical transmission device, the light reception device, and the communication control device. The light reception device receives the spatial light signal transmitted from the communication target. The light reception device decodes a signal included in the received spatial light signal. The communication control device acquires a signal decoded by the light reception device. The communication control device causes the optical transmission device to transmit a spatial light signal related to the acquired signal. The optical transmission device includes a light source, a spatial light modulator, and a control unit. The light source emits light. The spatial light modulator includes a modulation part to which light emitted from a light source is radiated. In the spatial light modulator, the phase of the radiated light is modulated by the modulation part. The control unit allocates the modulation region associated with each of the plurality of communication targets to the modulation part of the spatial light modulator. The control unit sets, as the modulation region, a phase image for forming an image used for communication with the communication target at a position of the communication target. The control unit dynamically changes the number of the plurality of modulation regions allocated to the modulation part of the spatial light modulator according to the number of the plurality of communication targets. The control unit controls the light source so that the modulation part in which the phase image is set is radiated with light.

In the modulation part of the spatial light modulator, a modulation region is set for each communication target. Therefore, when the number of modulation regions is fixed, communication with a new communication target cannot be established when all modulation regions are used. In the present example embodiment, the number of the plurality of modulation regions allocated to the modulation part of the spatial light modulator is dynamically changed according to the number of the plurality of communication targets in association with each of the plurality of communication targets. Therefore, according to the present example embodiment, since a situation in which the modulation region cannot be used hardly occurs, it is possible to achieve continuous optical space communication with a plurality of communication targets.

In one aspect of the present example embodiment, the control unit sets, in the modulation part, a preliminary region that is not used for communication with the communication target. According to the present aspect, by setting a preliminary region not used for communication and dynamically allocating a modulation region to the preliminary region, it is possible to flexibly cope with the communication situation.

In one aspect of the present example embodiment, the control unit dynamically allocates a part of the preliminary region as the modulation region according to an increase in the number of communication targets. According to the present aspect, when the number of communication targets increases, continuous optical space communication can be implemented with a plurality of communication targets by dynamically allocating the modulation region to the preliminary region.

In one aspect of the present example embodiment, the control unit integrates the modulation region that is no longer used for communication with the communication target into the preliminary region according to the decrease in the number of communication targets. If the modulation region not used for communication is set as it is, unnecessary power may be generated due to the modulation region not used. According to the present aspect, when the number of communication targets decreases, the power consumption of the spatial light modulator can be optimized by integrating the modulation region that is no longer used for communication into the preliminary region.

Third Example Embodiment

Next, a communication device according to a third example embodiment will be described with reference to the drawings. A communication device of the present example embodiment is different from the first to second example embodiments in that tiling of a modulation region set in a modulation part is adjusted according to an output profile of an image displayed in a projection range. The method of the present example embodiment may be combined with the method of the second example embodiment.

(Configuration)

Figure 21:
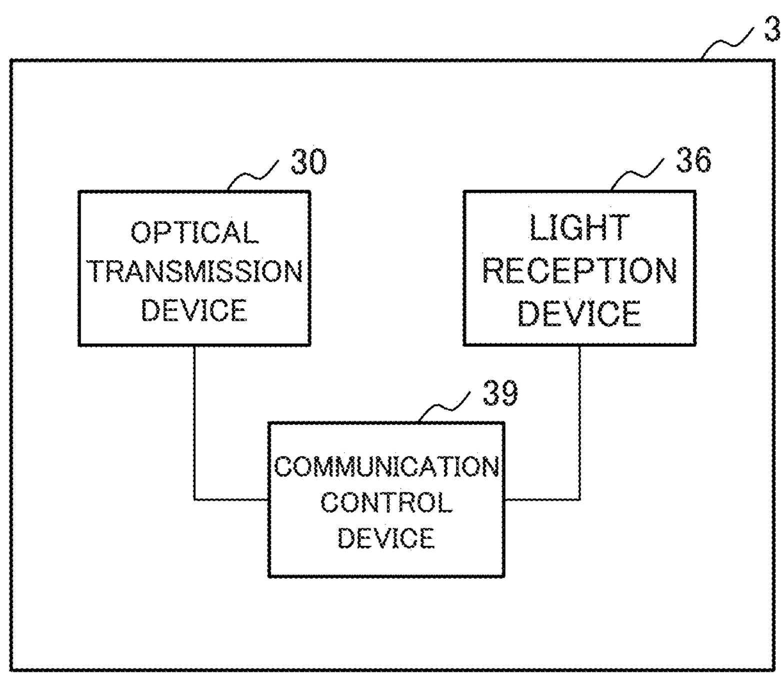
FIG. 21 is a block diagram illustrating an example of a configuration of a communication device according to a third example embodiment.

FIG. 21 is a block diagram illustrating an example of a configuration of the communication device 2 of the present example embodiment. The communication device 3 of the present example embodiment includes an optical transmission device 30, a light reception device 36, and a communication control device 39. The light reception device 36 and the communication control device 39 have the same configurations as those of the first example embodiment. Hereinafter, the description of the light reception device 36 and the communication control device 39 will be omitted, and the configuration of the optical transmission device 30 will be described in detail. In the present example embodiment, an example in which the light transmission condition of the spatial light signal is set by the optical transmission device 30 will be described. The light transmission condition of the spatial light signal may be set by the communication control device 39.

[Light Transmission Device]

Figure 22:
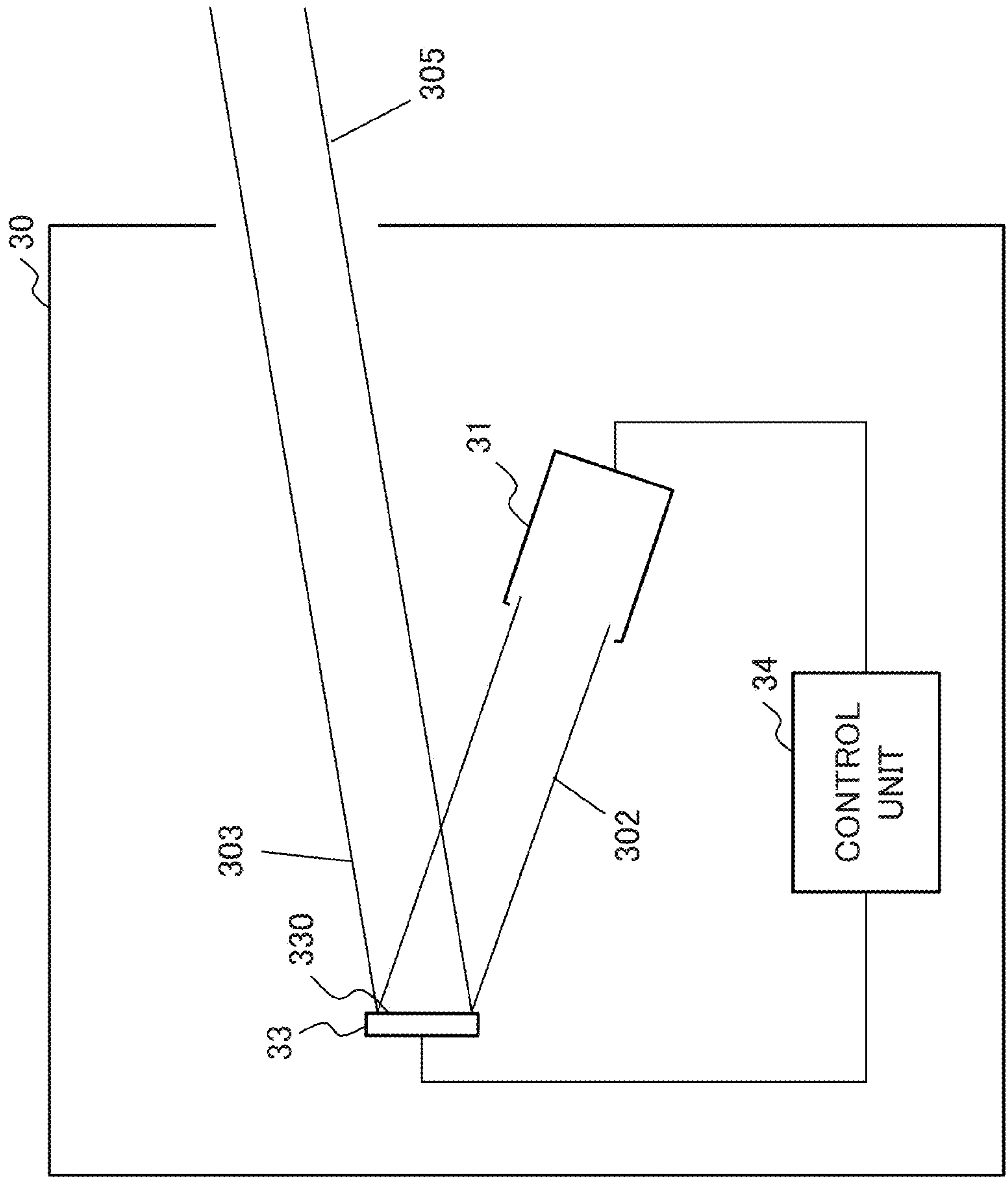
FIG. 22 is a conceptual diagram illustrating an example of a configuration of an optical transmission device included in a communication device according to the third example embodiment.

FIG. 22 is a conceptual diagram illustrating an example of a configuration of the optical transmission device 30. The optical transmission device 30 includes a light source 31, a spatial light modulator 33, and a control unit 34. The spatial light modulator 33 includes a modulation part 330. FIG. 22 is a side view of the internal configuration of the optical transmission device 30 as viewed from the lateral direction. FIG. 22 is conceptual, and does not accurately represent the positional relationship between the components, the traveling direction of light, and the like. The position of the control unit 34 is not particularly limited. The control unit 34 may be included in the communication control device 39. The light source 31 and the spatial light modulator 33 are similar to corresponding configurations in the first example embodiment. The control unit 34 has the same configuration as that of the first example embodiment except for the tiling method in the modulation part 330 of the spatial light modulator 33. Hereinafter, a method of tiling in the modulation part 330 of the spatial light modulator 33 by the control unit 34 will be focused and described.

Figure 23:
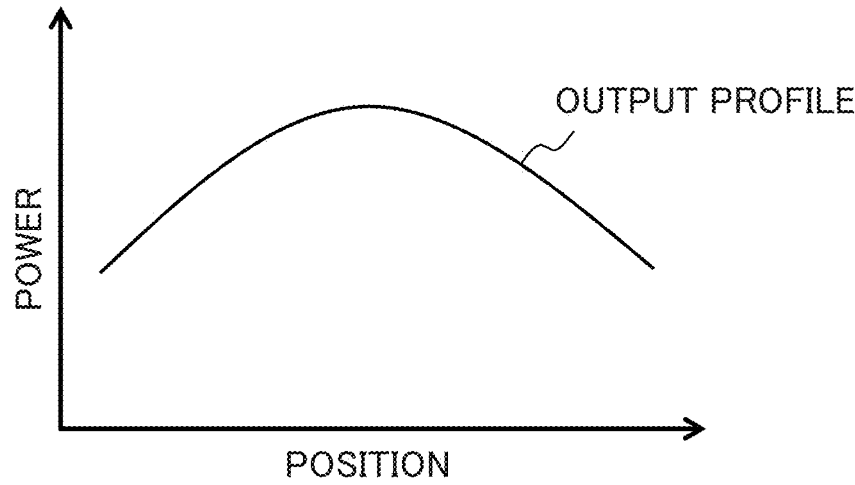
FIG. 23 is a graph illustrating an example of energy distribution of an image displayed by projection light projected from an optical transmission device included in a communication device according to the third example embodiment.

FIG. 23 illustrates an example of an energy distribution (also referred to as an output profile) of an image (dot image) formed on a projection surface by projection light 305. The horizontal axis of the graph of FIG. 23 indicates the position on the projection target surface. The vertical axis of the graph of FIG. 23 indicates the power of the dot image displayed by the projection light 305 for each position on the projection surface. FIG. 23 illustrates a one-dimensional energy distribution on a straight line passing through the center of the projection range. The actual output profile shows a two-dimensional energy distribution. The actual output profile shows an energy distribution centered at the center of the projection range and distributed concentrically. The output profile of the dot image on the projection target surface indicates a non-linear power distribution. The output profile of the dot image on the projection target surface is changed by the projection optical system for projecting the projection light 305. For example, when a mechanism for removing 0th-order light included in projection light 305 is introduced, a dot image is not displayed at the projection position of the 0th-order light, so that a profile to which power is applied at the central portion of the projection range is obtained. In the example of FIG. 23, the dot image has the maximum power when displayed at the center of the projection range. The dot image decreases in power as it goes away from the center of the projection range. That is, the power of the dot image formed on the projection surface is not uniform in the plane of the projection surface.

As in the example of FIG. 23, if the power of the dot image on the projection surface is not uniform, the output of the spatial light signal used for communication with the communication target is not stable. If the output of the spatial light signal is not stable, stable communication cannot be continued. In order to continue stable communication, it is preferable that the dot image is flat as long as the power of the dot image is sufficient in the plane of the projection target surface.

The power EP of the dot image can be estimated by the relationship among the output W, the output profile P, the phase image factor PF, and the number of tiles N. The output W is an output of the light 302 emitted from the light source 31 and radiated to the modulation part 330 of the spatial light modulator 33. The output profile P is the power of the dot image for each position on the projection surface. The phase image factor PF includes various factors. For example, the phase image factor PF includes a factor related to brightness of the phase image. For example, the phase image factor PF includes a factor related to a normalized value of the illumination light used in generating the phase image. For example, the phase image factor PF is a factor related to the presence or absence and the shape of the noise sweeping region set when the phase image is generated. The number N of tiles is the number of tiles for each modulation region. For example, the power EP of the projection light 305 can be expressed by a relationship of Equation 1 below.

$$P = W \times P \times F \times N \tag{1}$$

It is difficult to finely adjust the output W and the output profile P according to a change in the communication situation. It can be adjusted by changing some factor. However, it is difficult to equalize the power of the dot image over the entire region of the projection surface by adjusting only the phase image factor PF. Therefore, in the present example embodiment, the power of the dot image on the projection surface is adjusted by combining the adjustment of the phase image factor PF and the number N of tiles. In forming a dot image, the number N of tiles used for forming the dot image is important. When the number N of tiles is small, the dot image is deteriorated. Therefore, in the present example embodiment, the number N of tiles is set to be increased while the resolution of the tiles is kept low.

In the present example embodiment, the phase image set for the plurality of tiles included in the modulation region allocated to the modulation part 330 of the spatial light modulator 33 and the number of tiles allocated to the modulation region are set according to the position on the projection surface.

Figure 24:
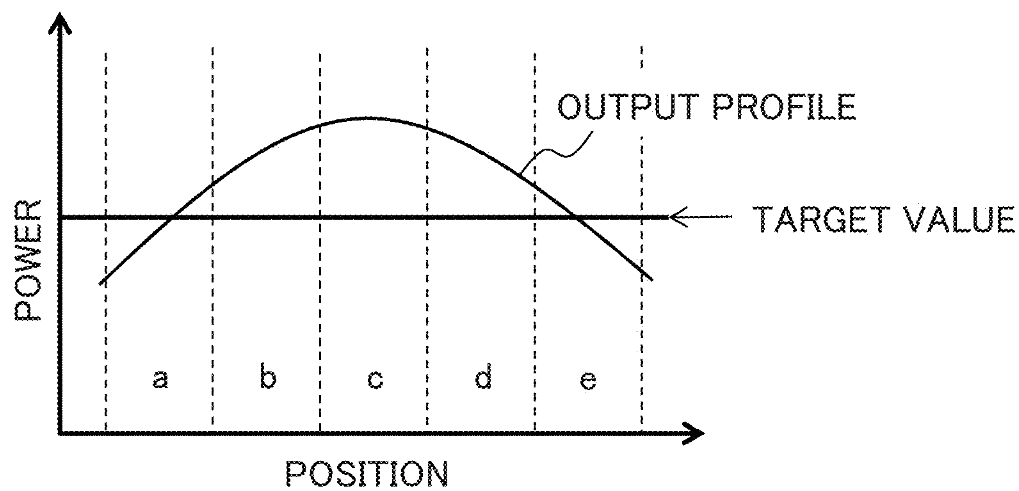
FIG. 24 is a conceptual diagram for explaining region division of a projection range of the projection light projected from an optical transmission device included in a communication device according to the third example embodiment.

FIG. 24 is a conceptual graph for explaining an example of dot image power control by the optical transmission device 30. The graph of FIG. 24 illustrates an output profile of a dot image formed on the projection target surface by the projection light 305. The output profile of FIG. 24 is similar to the output profile of FIG. 23. The graph of FIG. 24 illustrates a target value of the power of the dot image. For example, the target value of power is set according to the class of laser beam used for spatial optical communication. For example, assuming a visible-light laser of class 1, the target value of power is set to about 0.39 watts. For example, assuming a class 1 infrared light laser in the 1.5 micrometer band, the target value of power is set to about 10 milliwatts. FIG. 24 illustrates an example in which the projection target surface is one-dimensionally divided into five regions on a straight line passing through the center of the projection target surface. In the example of FIG. 24, the projection target surface is divided into five regions (region a, region b, region c, region d, region e). In practice, the two-dimensional projection surface is divided into regions in a lattice shape.

The optical transmission device 30 sets the phase image in which the lower limit of the output profile becomes the target value of the power for each region. As can be seen in the output profile, the power of the dot image decreases with distance from the center of the projected surface. Therefore, a phase image for displaying a brighter dot image is set in a region farther from the center of the projection range. On the other hand, a phase image for displaying a dark dot image is set in a region closer to the center of the projection range. The phase image for displaying the dot image in each region decreases the number of tiles set in the modulation region as approaching the center of the projection surface within the range of each region.

Figure 25:
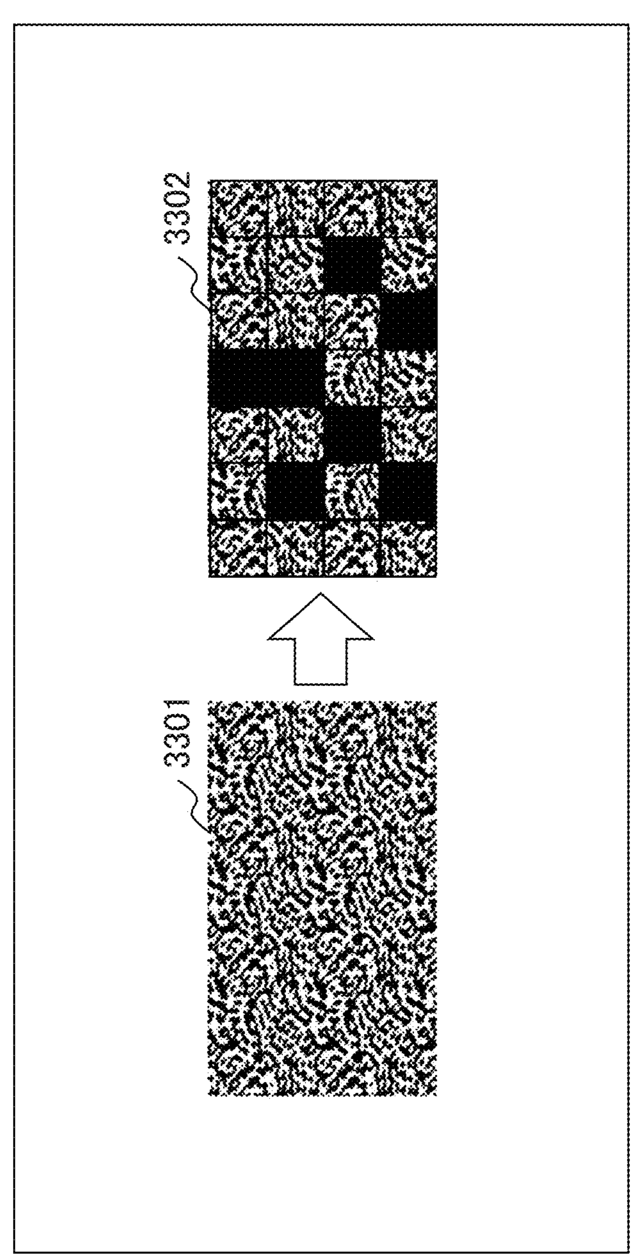
FIG. 25 is a conceptual diagram for describing an example of tiling of a modulation region allocated to a modulation part of a spatial light modulator of an optical transmission device included in a communication device according to the third example embodiment.

FIG. 25 is a conceptual diagram illustrating an example of reducing the number of tiles set in the modulation region allocated to the modulation part 330 of the spatial light modulator 33. The modulation region includes a plurality of tiles. A phase image for displaying a dot image on the projection surface is displayed on each of the plurality of tiles. The same phase image is set to a plurality of tiles included in the same modulation region. A phase image 3301 is a pattern set in the modulation region. The phase image 3301 includes a phase image set for each of the plurality of tiles included in the modulation region.

A phase image 3302 in FIG. 25 is an example in which the number of tiles (active tiles) used to display the dot image is reduced. Light 302 radiated to a tile (also referred to as an inactive tile) not used for displaying a dot image is not converted into modulated light 303 and contributes to 0th-order light. The inactive tile is not reflected in the display of the dot image displayed on the projection target surface. Even if the number of active tiles is reduced, the displayed dot images are the same. Therefore, by reducing the number of active tiles, the power of the dot image can be reduced without changing the displayed dot image. In other words, the power of the dot image can be adjusted by adjusting the number of tiles used to display the dot image.

The power of the dot image is maximized when the phase image is set to all of the plurality of tiles included in the modulation region. Therefore, the power of the dot image displayed by the projection light 305 projected in a state where the phase image is set for all the tiles is set to the target value of the power of the dot image displayed in each region. In each region, the phase image is set to all the tiles included in the modulation region in order to display the dot image at the position farthest from the center of the projection range. As the display position of the dot image is closer to the center of the projection range, the power of the dot image in each region can be brought closer to the target value by reducing the number of tiles used to display the dot image.

Figure 26:
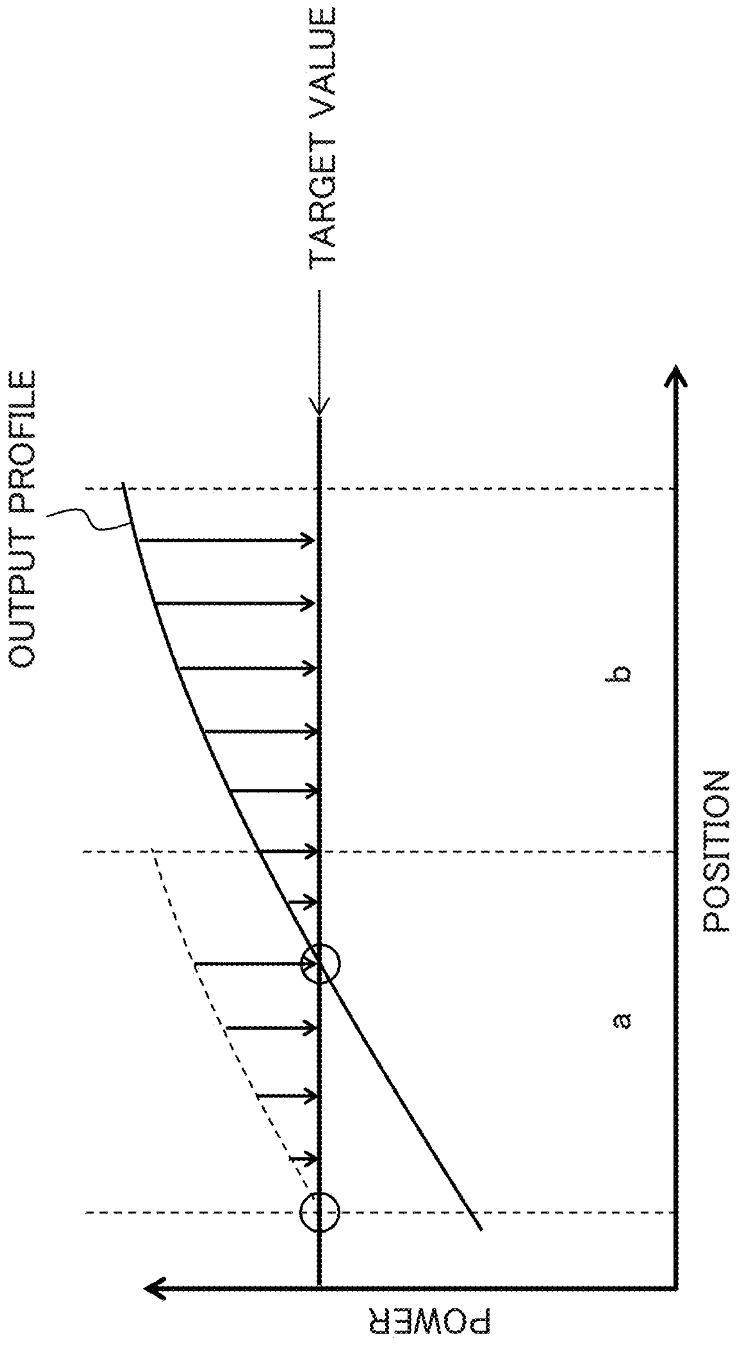
FIG. 26 is a conceptual diagram for describing an example of power control of the projection light by an optical transmission device included in a communication device according to the third example embodiment.

FIG. 26 is a conceptual diagram for describing an example of power control of a dot image. FIG. 26 is an enlarged view of a region a and a region b in FIG. 24. The optical transmission device 30 sets the phase image for displaying the dot image indicating the power equivalent to the target value of the power at the left end point of the region a as the modulation region allocated to the modulation part 330 of the spatial light modulator 33. As the phase image set in the modulation region is shifted such that the position of the dot image moves toward the center of the projection range, the power increases as indicated by the dotted line according to the tendency of the output profile. As for the region a, the power increases from the left end to the right end of the region a. If the number of tiles in the modulation region is reduced so that the power of the dot image approaches the target value at the position where the power increases as indicated by the dotted line, the power of the dot image in the region a can be kept constant. In the example of FIG. 26, the output profile intersects the target value of the power within the range of the region a. Therefore, for the position where the output profile and the target value of power intersect, a phase image indicating power equivalent to the target value of power may be set in the modulation region. At a position from the position where the output profile and the target value of power intersect to the right end of the region b, the number of tiles in the modulation region may be reduced so that the power of the dot image approaches the target value. As for region c and region d in FIG. 24, similarly to region b, the number of tiles in the modulation region may be decreased according to the position of the projection range. For the region e in FIG. 24, a phase image for displaying a dot image indicating power equivalent to the target value of power at a point at the right end of the region e is set as the modulation region allocated to the modulation part 330 of the spatial light modulator 33. When the phase image set in the modulation region is shifted so that the position of the dot image is away from the center of the projection range, the power decreases according to the tendency of the output profile. The power of the region e decreases from the left end to the right end of the region e. If the number of tiles in the modulation region is reduced so that the power of the dot image approaches the target value at the position where the power increases, the power of the dot image in the region e can be kept constant.

Figure 27:
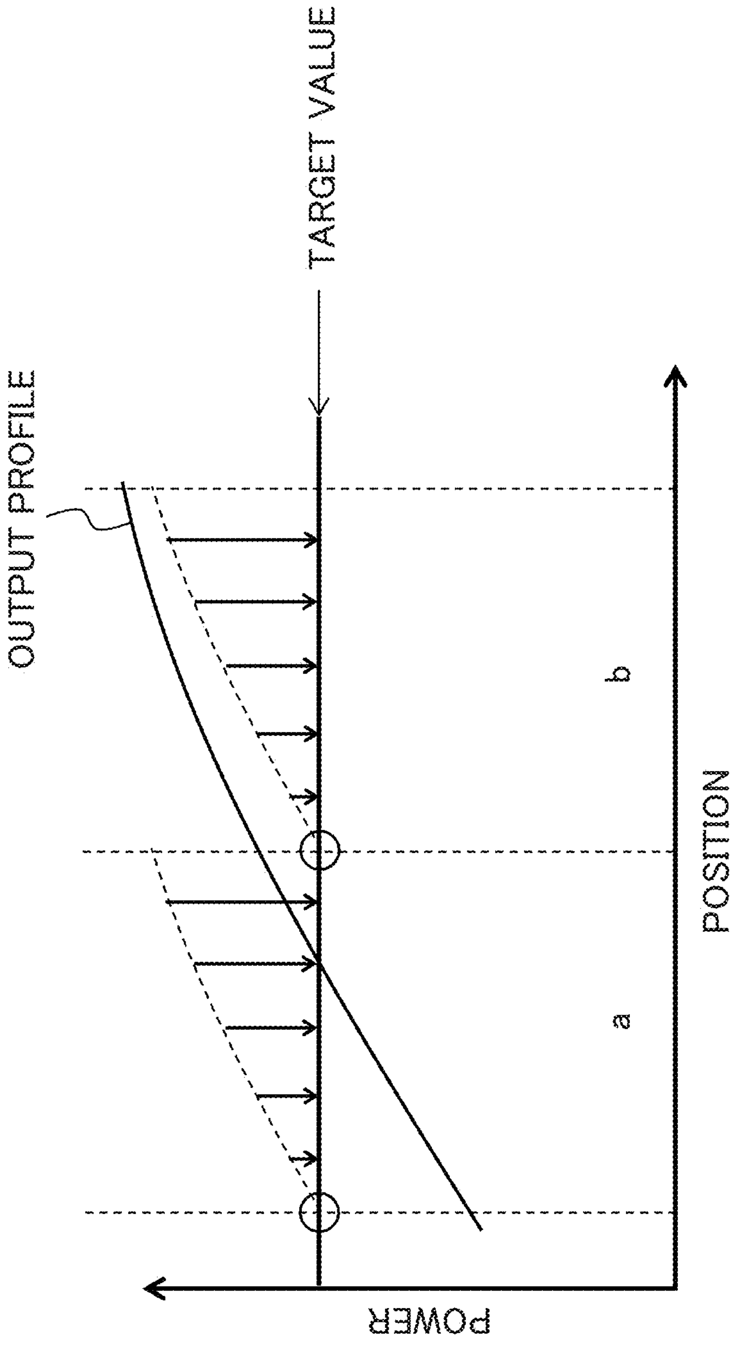
FIG. 27 is a conceptual diagram for explaining another example of power control of the projection light by the optical transmission device included in the communication device according to the third example embodiment.

FIG. 27 is a conceptual diagram for describing another example of the power control of the dot image. FIG. 27 is an enlarged view of a region a and a region b in FIG. 24. The optical transmission device 30 sets a phase image indicating power equivalent to the target value of power at a left end point of the region a as the modulation region allocated to the modulation part 330 of the spatial light modulator 33. As the phase image set in the modulation region is shifted such that the position of the dot image moves toward the center of the projection range, the power increases as indicated by the dotted line according to the tendency of the output profile. If the number of tiles in the modulation region is reduced so that the power of the dot image approaches the target value at the position where the power increases as indicated by the dotted line, the power of the dot image in the region a can be kept constant. In the example of FIG. 27, the number of tiles of the modulation region is reduced such that the power of the dot image approaches the target value in the entire range of the region a. Similarly to the region a, the region b may be controlled so that the power of the dot image approaches the target value. Description of the region c, the region d, and the region e will be omitted.

For example, a table in which the number of inactive tiles is associated with the position of the projection range may be prepared. With reference to the table, the optical transmission device 30 can set the number of inactive tiles according to the position where the dot image is displayed. The position of the inactive tile in the modulation region can be arbitrarily set.

For example, a table in which the tiled phase images of the active tile and the inactive tile are associated with the position of the projection range may be prepared. The phase image with tiled active and inactive tiles includes a number of active tiles depending on the power of the dot image. With reference to the table, the optical transmission device 30 can set the phase image in which the inactive tile is patterned according to the position where the dot image is displayed. The position of the inactive tile in the modulation region can be arbitrarily set.

For example, a map in which the tiled phase images of the active tile and the inactive tile are mapped to the position of the projection range may be prepared. The phase image with tiled active and inactive tiles includes a number of active tiles depending on the power of the dot image. For example, the optical transmission device 30 may select the phase image from the map according to the position where the dot image is displayed. The position of the inactive tile in the modulation region can be arbitrarily set.

As described above, the communication device of the present example embodiment includes the optical transmission device, the light reception device, and the communication control device. The light reception device receives the spatial light signal transmitted from the included in the received spatial light signal. The communication control device acquires a signal decoded by the light reception device. The communication control device causes the optical transmission device to transmit a spatial light signal related to the acquired signal. The optical transmission device includes a light source, a spatial light modulator, and a control unit. The light source emits light. The spatial light modulator includes a modulation part to which light emitted from a light source is radiated. In the spatial light modulator, the phase of the radiated light is modulated by the modulation part. The control unit allocates the modulation region associated with each of the plurality of communication targets to the modulation part of the spatial light modulator. The control unit sets, as the modulation region, a phase image for forming an image used for communication with the communication target at a position of the communication target. The control unit changes the phase image set to the plurality of tiles allocated to the modulation region according to the projection position of the image in the projection range such that the power of the image displayed in the projection range of the image approaches the target value. The control unit controls the light source so that the modulation part in which the phase image is set is radiated with light.

The power of the image displayed in the projection range varies depending on the position inside the projection range. In the present example embodiment, the power of the image displayed in the projection range is brought close to the target value by changing the phase image set to the plurality of tiles allocated to the modulation region according to the projection position of the image in the projection range. Therefore, according to the present example embodiment, the image displayed in the projection range can be smoothed. That is, according to the present aspect, the power of the spatial light signal radiated to the communication target can be stabilized.

In one aspect of the present example embodiment, the control unit sets any of the plurality of tiles allocated to the modulation region as an inactive tile in which no phase image is set. The control unit adjusts the number of inactive tiles according to the projection position of the image in the projection range so that the power of the image displayed in the projection range approaches the target value. According to the present aspect, the power of the projected image can be adjusted by changing the number of the plurality of tiles constituting the modulation region.

In one aspect of the present example embodiment, the control unit changes the phase image set for the plurality of tiles allocated to the modulation region for each region set inside the projection range. According to the present aspect, the power of the projected image can be adjusted by setting the phase image for each region set inside the projection range.

Fourth Example Embodiment

Figure 28:
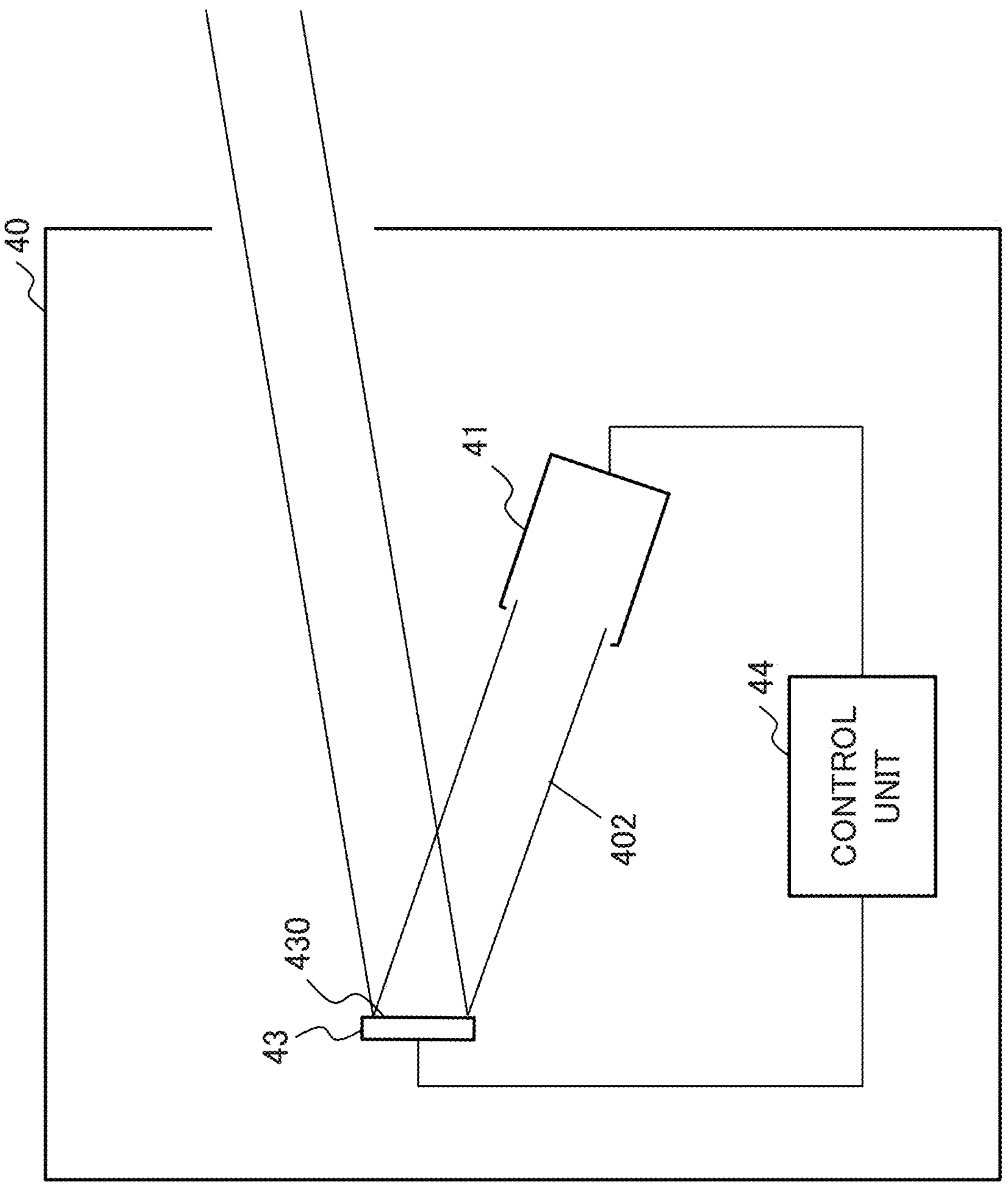
FIG. 28 is a block diagram illustrating an example of a configuration of an optical transmission device according to a fourth example embodiment.

Next, an optical transmission device according to a fourth example embodiment will be described with reference to the drawings. The optical transmission device of the present example embodiment has a configuration in which the optical transmission devices of the first to third example embodiments are simplified. FIG. 28 is a conceptual diagram illustrating an example of a configuration of the optical transmission device 40 of the present example embodiment. The optical transmission device 40 includes a light source 41 and a spatial light modulator 43.

The light source 41 emits light 402. The spatial light modulator 43 includes a modulation part 430 radiated with the light 402 emitted from the light source 41. In the spatial light modulator 43, the phase of the radiated light 402 is modulated by the modulation part 430. The control unit 44 allocates the modulation region associated with each of the plurality of communication targets to the modulation part 430 of the spatial light modulator 43. The control unit 44 sets, as the modulation region, a phase image for forming an image used for communication with the communication target at a position of the communication target. The control unit 44 controls the light source 41 so that the light 402 is radiated to the modulation part 430 to which the phase image is set.

As described above, in the present example embodiment, the modulation region for each communication target is set in the modulation part of the spatial light modulator in association with each of the plurality of communication targets. In the modulation region, a phase image for each communication target is set. According to the present example embodiment, since the modulation region for each communication target is set in the modulation part, a stable spatial light signal can be transmitted to a plurality of communication targets.

(Hardware)

Here, a hardware configuration for executing control and processing according to each example embodiment of the present disclosure will be described using the information processing device 90 of FIG. 29 as an example. The information processing device 90 in FIG. 29 is a configuration example for executing control and processing of each example embodiment, and does not limit the scope of the present disclosure.

Figure 29:
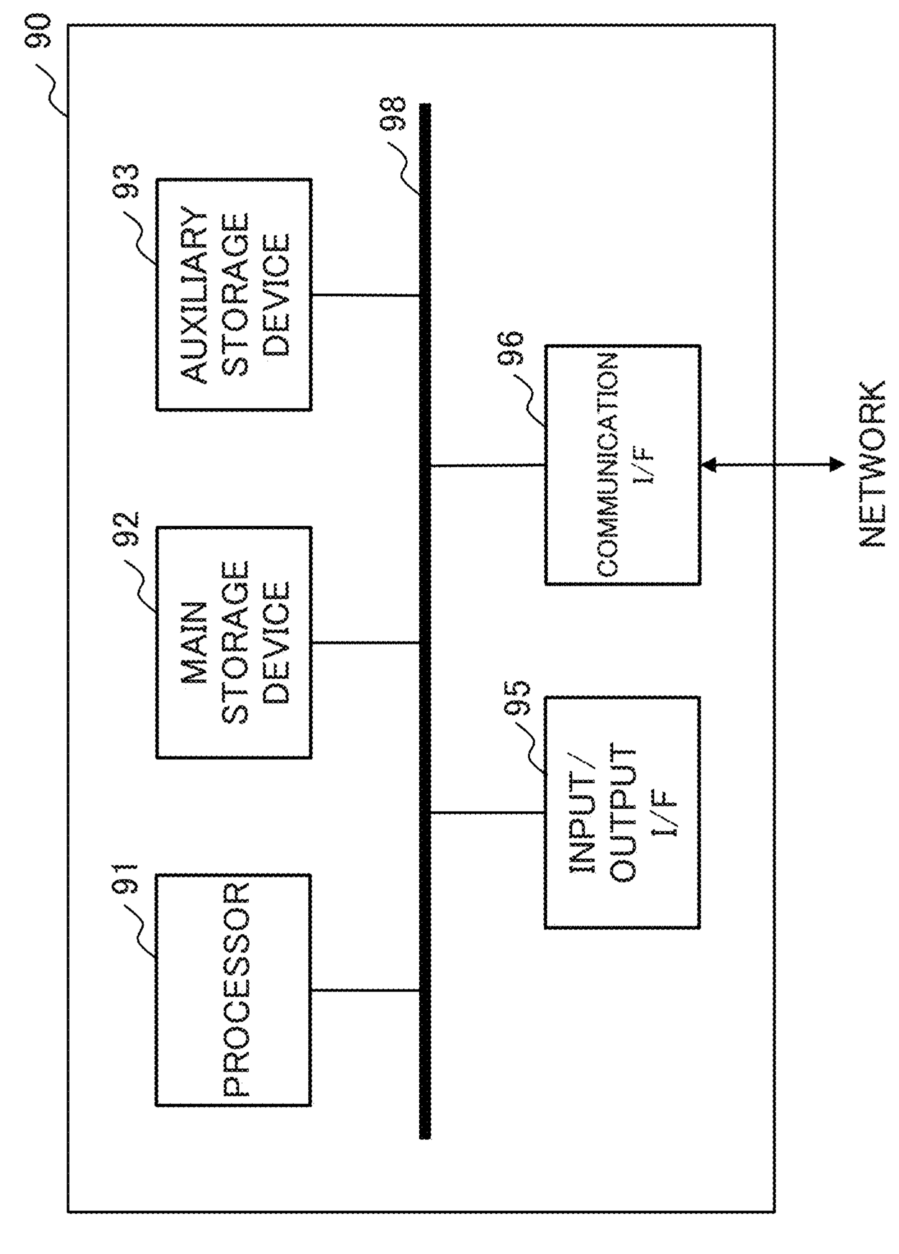
FIG. 29 is a block diagram illustrating an example of a hardware configuration that implements control and processing according to each example embodiment.

As illustrated in FIG. 29, the information processing device 90 includes a processor 91, a main storage device 92, an auxiliary storage device 93, an input/output interface 95, and a communication interface 96. In FIG. 29, the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like in the main storage device 92. The processor 91 executes the program developed in the main storage device 92. In the present example embodiment, a software program installed in the information processing device 90 may be used. The processor 91 executes control and processing according to the present example embodiment.

The main storage device 92 has an area in which a program is developed. A program stored in the auxiliary storage device 93 or the like is developed in the main storage device 92 by the processor 91. The main storage device 92 is, for example, a volatile memory such as a dynamic random access memory (DRAM). A nonvolatile memory such as a magnetoresistive random access memory (MRAM) may be configured/added as the main storage device 92.

The auxiliary storage device 93 stores various types of data such as programs. The auxiliary storage device 93 is a local disk such as a hard disk or a flash memory. Various types of data may be stored in the main storage device 92, and the auxiliary storage device 93 may be omitted.

The input/output interface 95 is an interface for connecting the information processing device 90 and a peripheral device based on a standard or a specification. The communication interface 96 is an interface for connecting to an external system or device through a network such as the Internet or an intranet based on a standard or a specification. The input/output interface 95 and the communication interface 96 may be shared as an interface connected to an external device.

Input devices such as a keyboard, a mouse, and a touch panel may be connected to the information processing device 90 as necessary. These input devices are used for inputting information and settings. When the touch panel is used as the input device, the display screen of the display device may also serve as the interface of the input device. Data communication between the processor 91 and the input device may be mediated by the input/output interface 95.

The information processing device 90 may be provided with a display device for displaying information. In a case where a display device is provided, the information processing device 90 preferably includes a display control device (not illustrated) for controlling display of the display device. The display device may be connected to the information processing device 90 via the input/output interface 95.

The information processing device 90 may be provided with a drive device. The drive device mediates reading of data and a program from a recording medium, writing of a processing result of the information processing device 90 to the recording medium, and the like between the processor 91 and the recording medium (program recording medium). The drive device may be connected to the information processing device 90 via the input/output interface 95.

The above is an example of a hardware configuration for enabling control and processing according to each example embodiment of the present invention. Note that the hardware configuration of FIG. 29 is an example of a hardware configuration for executing control and processing according to each example embodiment, and does not limit the scope of the present invention. A program for causing a computer to execute control and processing according to each example embodiment is also included in the scope of the present invention. Further, a program recording medium in which the program according to each example embodiment is recorded is also included in the scope of the present invention. The recording medium can be achieved by, for example, an optical recording medium such as a compact disc (CD) or a digital versatile disc (DVD). The recording medium may be a semiconductor recording medium such as a universal serial bus (USB) memory or a secure digital (SD) card. The recording medium may be a magnetic recording medium such as a flexible disk, or another recording medium. In a case where the program executed by the processor is recorded in the recording medium, the recording medium corresponds to a program recording medium.

The components of each example embodiment may be arbitrarily combined. In addition, the components of each example embodiment may be implemented by software or may be implemented by a circuit.

Although the present invention has been described with reference to the example embodiments, the present invention is not limited to the above example embodiments. Various modifications that can be understood by those of ordinary skill in the art can be made to the configuration and details of the present invention within the scope of the present invention.

Some or all of the above example embodiments may be described as the Following Supplementary Notes, but are not Limited to the Following.

(Supplementary Note 1)

A optical transmission device including:

a light source;

a spatial light modulator having a modulation part to which light emitted from the light source is radiated, the spatial light modulator modulating a phase of the emitted light using the modulation part; and a control unit configured to allocate a modulation region associated with each of a plurality of communication targets to the modulation part of the spatial light modulator, set, in the modulation region, a phase image for forming an image used for communication with the communication target at a position of the communication target, and control the light source in such a way that the light is radiated to the modulation part in which the phase image is set.

(Supplementary Note 2)

The optical transmission device according to supplementary note 1, in which the control unit sets the phase image for displaying the image at the position of the communication target associated with each of a plurality of the modulation regions to each of the plurality of modulation regions allocated to the modulation part of the spatial light modulator.

(Supplementary Note 3)

The optical transmission device according to supplementary note 1, in which the control unit sets, for each of the plurality of communication targets, the phase image for displaying the image at the position of the communication target associated with each of a plurality of the modulation regions in each of the plurality of modulation regions allocated to the modulation part of the spatial light modulator.

(Supplementary Note 4)

The optical transmission device according to any one of supplementary notes 1 to 3, in which the control unit sets a composite image obtained by combining the phase image for displaying the image and a shift image for changing a display position of the image at the position of the communication target associated with each of a plurality of the modulation regions in each of the plurality of modulation regions allocated to the modulation part of the spatial light modulator.

(Supplementary Note 5)

The optical transmission device according to any one of supplementary notes 1 to 3, in which the control unit sets a composite image obtained by combining the phase image for displaying the image, a shift image for changing a display position of the image at the position of the communication target associated with each of a plurality of the modulation regions, and a virtual lens image for enlarging and projecting the image in each of the plurality of modulation regions allocated to the modulation part of the spatial light modulator.

(Supplementary Note 6)

The optical transmission device according to any one of supplementary notes 1 to 5, in which the control unit dynamically changes a number of a plurality of the modulation regions allocated to the modulation part of the spatial light modulator according to a number of the plurality of communication targets.

(Supplementary Note 7)

The optical transmission device according to supplementary note 6, in which the control unit sets a preliminary region not used for communication with the communication target in the modulation part.

(Supplementary Note 8)

The optical transmission device according to supplementary note 7, in which the control unit dynamically allocates a part of the preliminary region as the modulation region according to an increase in the number of the communication targets.

(Supplementary Note 9)

The optical transmission device according to supplementary note 7 or 8, in which the control unit integrates the modulation region that is no longer used for communication with the communication target into the preliminary region according to a decrease in the number of the communication targets.

(Supplementary Note 10)

The optical transmission device according to any one of supplementary notes 1 to 9, in which the control unit changes the phase image set for a plurality of tiles allocated to the modulation region according to a projection position of the image in a projection range of the image in such a way that power of the image displayed in the projection range of the image approaches a target value.

(Supplementary Note 11)

The optical transmission device according to supplementary note 10, in which the control unit sets one of the plurality of tiles allocated to the modulation region as an inactive tile in which the phase image is not set, and adjusts a number of inactive tiles according to the projection position of the image in the projection range in such a way that the power of the image displayed in the projection range approaches the target value.

(Supplementary Note 12)

The optical transmission device according to supplementary note 11, in which the control unit changes the phase image set for the plurality of tiles allocated to the modulation region for each region set inside the projection range.

(Supplementary Note 13)

A communication device including:

the optical transmission device according to any one of supplementary notes 1 to 12;

a light reception device configured to receive a spatial light signal transmitted from a communication target and decode a signal included in the received spatial light signal; and a communication control device configured to acquire the signal decoded by the light reception device and cause the optical transmission device to transmit a spatial light signal related to the acquired signal.

(Supplementary Note 14)

A method for controlling an optical transmission device including a spatial light modulator that modulates a phase of light emitted from a light source using a modulation part, the method causing a computer to execute:

allocating a modulation region associated with each of a plurality of communication targets to the modulation part of the spatial light modulator;

setting, in the modulation region, a phase image for forming an image used for communication with the communication target at a position of the communication target; and controlling the light source in such a way that the light is radiated to the modulation part in which the phase image is set.

(Supplementary Note 15)

A program for controlling an optical transmission device including a spatial light modulator that modulates a phase of light emitted from a light source using a modulation part, the program causing a computer to execute:

a process of allocating a modulation region associated with each of a plurality of communication targets to the modulation part of the spatial light modulator;

a process of setting, in the modulation region, a phase image for forming an image used for communication with the communication target at a position of the communication target; and a process of controlling the light source in such a way that the light is radiated to the modulation part in which the phase image is set.

REFERENCE SIGNS LIST

1, 2, 3 Communication device
10, 20, 30, 40 Light transmission device
11, 21, 31, 41 Light source

13, 23, 33, 43 Spatial light modulator
14, 24, 34, 44 Control unit
16, 26, 36 Light reception device
17 Light-receiving element
18 Receiving circuit
19, 29, 39 Communication control device
111 Emitter
112 Lens
161 Concentrator
191 Condition storage unit
192 Light transmission condition generation unit
193 Light transmission instruction unit
195 Signal acquisition unit
196 Signal analysis unit
197 Signal generation unit

What is claimed is:

1. A optical transmission device comprising:

a light source;

a spatial light modulator having a modulation part to which light emitted from the light source is radiated, the spatial light modulator modulating a phase of the emitted light using the modulation part; and a controller that comprises a memory storing instructions, and a processor connected to the memory and configured to execute the instructions to:

allocate a modulation region associated with each of a plurality of communication targets to the modulation part of the spatial light modulator;

set, in the modulation region, a phase image for forming an image used for communication with the communication target at a position of the communication target; and control the light source in such a way that the light is radiated to the modulation part in which the phase image is set.

2. The optical transmission device according to claim 1, wherein the processor is configured to execute the instructions to set the phase image for displaying the image at the position of the communication target associated with each of a plurality of the modulation regions to each of the plurality of modulation regions allocated to the modulation part of the spatial light modulator.

3. The optical transmission device according to claim 1, wherein the processor is configured to execute the instructions to set, for each of the plurality of communication targets, the phase image for displaying the image at the position of the communication target associated with each of a plurality of the modulation regions in each of the plurality of modulation regions allocated to the modulation part of the spatial light modulator.

4. The optical transmission device according to claim 1, wherein the processor is configured to execute the instructions to set a composite image obtained by combining the phase image for displaying the image and a shift image for changing a display position of the image at the position of the communication target associated with each of a plurality of the modulation regions in each of the plurality of modulation regions allocated to the modulation part of the spatial light modulator.

5. The optical transmission device according to claim 1, wherein the processor is configured to execute the instructions to set a composite image obtained by combining the phase image for displaying the image, a shift image for changing a display position of the image at the position of the communication target associated with each of a plurality of the modulation regions, and a virtual lens image for enlarging and projecting the image in each of the plurality of modulation regions allocated to the modulation part of the spatial light modulator.

6. The optical transmission device according to claim 1, wherein the processor is configured to execute the instructions to dynamically change a number of a plurality of the modulation regions allocated to the modulation part of the spatial light modulator according to a number of the plurality of communication targets.

7. The optical transmission device according to claim 6, wherein the processor is configured to execute the instructions to set a preliminary region not used for communication with the communication target in the modulation part.

8. The optical transmission device according to claim 7, wherein the processor is configured to execute the instructions to dynamically allocate a part of the preliminary region as the modulation region according to an increase in the number of the communication targets.

9. The optical transmission device according to claim 7, wherein the processor is configured to execute the instructions to integrate the modulation region that is no longer used for communication with the communication target into the preliminary region according to a decrease in the number of the communication targets.

10. The optical transmission device according to claim 1, wherein the processor is configured to execute the instructions to change the phase image set for a plurality of tiles allocated to the modulation region according to a projection position of the image in a projection range of the image in such a way that power of the image displayed in the projection range of the image approaches a target value.

11. The optical transmission device according to claim 10, wherein the processor is configured to execute the instructions to set one of the plurality of tiles allocated to the modulation region as an inactive tile in which the phase image is not set, and adjust a number of inactive tiles according to the projection position of the image in the projection range in such a way that the power of the image displayed in the projection range approaches the target value.

12. The optical transmission device according to claim 11, wherein the processor is configured to execute the instructions to change the phase image set for the plurality of tiles allocated to the modulation region for each region set inside the projection range.

13. A communication device comprising:

the optical transmission device according to claim 1;

a light reception device configured to receive a spatial light signal transmitted from a communication target and decode a signal included in the received spatial light signal; and a communication control device configured to acquire the signal decoded by the light reception device and cause the optical transmission device to transmit a spatial light signal related to the acquired signal.

14. A method for controlling an optical transmission device including a spatial light modulator that modulates a phase of light emitted from a light source using a modulation part, the method causing a computer to execute:

allocating a modulation region associated with each of a plurality of communication targets to the modulation part of the spatial light modulator;

setting, in the modulation region, a phase image for forming an image used for communication with the communication target at a position of the communication target; and controlling the light source in such a way that the light is radiated to the modulation part in which the phase image is set.

15. A non-transitory recording medium recording therein a program for controlling an optical transmission device including a spatial light modulator that modulates a phase of light emitted from a light source using a modulation part, the program causing a computer to execute:

a process of allocating a modulation region associated with each of a plurality of communication targets to the modulation part of the spatial light modulator;

a process of setting, in the modulation region, a phase image for forming an image used for communication with the communication target at a position of the communication target; and a process of controlling the light source in such a way that the light is radiated to the modulation part in which the phase image is set.

* * * * *